US012642622B2

(12) United States Patent
Schreiber

(10) Patent No.: US 12,642,622 B2
(45) Date of Patent: Jun. 2, 2026

(54) ENDODONTIC DRIVING AND OPERATING DEVICE

(71) Applicant: ReDentNova GmbH & CO. KG, Berlin (DE)

(72) Inventor: Zeev Schreiber, Berlin (DE)

(73) Assignee: ReDentNova GmbH & CO. KG, Berlin (DE)

( * ) Notice: Subject to any disclaimer, the term of this patent is extended or adjusted under 35 U.S.C. 154(b) by 350 days.

(21) Appl. No.: 18/265,277

(22) PCT Filed: Dec. 5, 2021

(86) PCT No.: PCT/EP2021/084296
§ 371 (c)(1),
(2) Date: Jun. 5, 2023

(87) PCT Pub. No.: WO2022/122602
PCT Pub. Date: Jun. 16, 2022

(65) Prior Publication Data
US 2024/0041561 A1 Feb. 8, 2024

(30) Foreign Application Priority Data
Dec. 8, 2020 (EP) ..................................... 20212388

(51) Int. Cl.
*A61C 5/40* (2017.01)
*A61C 1/00* (2006.01)
(Continued)

(52) U.S. Cl.
CPC ................ *A61C 5/40* (2017.02); *A61C 1/003* (2013.01); *A61C 1/0061* (2013.01); *A61C 1/06* (2013.01); *A61C 1/14* (2013.01); *A61C 1/181* (2013.01)

(58) Field of Classification Search
None
See application file for complete search history.

(56) References Cited

U.S. PATENT DOCUMENTS

| | | | |
|---|---|---|---|
| 2008/0176181 A1* | 7/2008 | Putz ......................... | A61C 1/00 433/104 |
| 2010/0248177 A1* | 9/2010 | Mangelberger .......... | A61C 1/12 307/104 |
| 2019/0271193 A1* | 9/2019 | Peters ..................... | E21B 47/13 |

OTHER PUBLICATIONS

International Search Report and Written Opinion for International Patent Application No. PCT/EP2021/084296 mailed Feb. 23, 2022, 14 pages.

* cited by examiner

*Primary Examiner* — Heidi M Eide
(74) *Attorney, Agent, or Firm* — Amin, Turocy & Watson, LLP

(57) ABSTRACT

The present invention relates to a device for driving an endodontic file head of an endodontic device and for operating a remote pump, the device comprising:
a gear for the connection with the endodontic file head;
a drive shaft for rotating the gear and for rotating at least one magnet;
a first cylindrical element surrounding the drive shaft;
a rotatable magnet holding means surrounding the first cylindrical element;
at least one magnet fixed in the rotatable magnet holding means;
a coil surrounding the rotatable magnet holding means;
a second cylindrical element surrounding the coil;
a central processing unit;
an inner encoder on the central processing unit for measuring the velocity of the drive shaft;
a transmitter;
an antenna for sending a signal to a remote pump; and
at least one sleeve interlinked with the drive shaft for moving the drive shaft by a motorized power handle.

15 Claims, 9 Drawing Sheets

(51) Int. Cl.

| | | |
|---|---|---|
| *A61C 1/06* | (2006.01) | |
| *A61C 1/14* | (2006.01) | |
| *A61C 1/18* | (2006.01) | |

State of the art embodiment

10

10

ENDODONTIC DRIVING AND OPERATING DEVICE

The present invention relates to a device for driving an endodontic file head of an endodontic device and operating a remote pump.

BACKGROUND OF THE INVENTION

During a root canal treatment of a tooth, an irrigation solution, such as sodium hypochlorite solution, is used in order to clean the root canal and the root canal is thereby shaped by rotational motion of a file.

The European patent application EP 2 449 999 A1 relates to a dental fluid-driven handle with a control circuit for the control of the rotational speed of a rotary part to a predetermined rotational speed. The handle comprises a rotary part that can be set in rotary motion by a drive fluid, a fluid line carrying the drive fluid to or from the rotary part, and a control circuit that is designed to control the rotational speed of the rotary part. US 2007/25461 A1 relates to a wireless remote control for dental equipment, such as dental scaler tools, dental drills, prophy angles and other rotary instruments. US 2019/282332 A1 describes an endodontic treatment method without a file in order to avoid spreading of a smear layer, which may include organic and/or inorganic debris, on the root canal wall after instrumentation and to avoid wounding of the root canal wall or apex. WO 2012/054905 A2 discloses an endodontic device comprising a fluid retainer to be applied to the tooth to retain fluid in a chamber of the tooth; and a pressure wave generator having a distal portion, the distal portion being configured to be inserted through the fluid retainer into the tooth chamber.

In the U.S. Pat. No. 10,327,866B2, the control of a pump for delivering an irrigation solution is described. However, the pump and the device for the endodontic treatment are operated independently of each other, i.e. the pump and the device do not communicate by a signal transfer. Operating the two devices individually and independently has the issue that shaping by rotational motion of the endodontic file and cleaning of the root canal by the irrigation solution are asynchronous resulting in a rotational treatment of the root canal in a dry state of root canal, which causes injuries of the root canal. Moreover, the dentist has to control the endodontic device and the pump, which bears a high risk of an accident. Therefore, there is a need to operate a pump and the endodontic file synchronously.

It is the objective of the present invention to provide a means for driving an endodontic file head, and simultaneously control the operation of a remote pump for delivering of an irrigation solution during endodontic root canal treatment in an ecological manner.

The objective of the present invention is solved by the teaching of the independent claims. Further advantageous features, aspects and details of the invention are evident from the dependent claims, the description, the figures, and the examples of the present application.

BRIEF DESCRIPTION OF THE INVENTION

The objective of the present invention is solved by a device (10) for driving an endodontic file head (500) of an endodontic device (1) and for operating a remote device (700), the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote device (700); and at least one sleeve (150) interlinked with the drive shaft (120) for moving the drive shaft (120) by a motorized power handle (600).

DESCRIPTION OF THE INVENTION

The term "endodontic file head" as used herein, refers to the part of the dental device containing at least an endodontic instrument and a drive arrangement or part of a drive arrangement. Moreover, the dental device may also contain an endodontic instrument holder.

The term "motorized power handle" as used herein, refers to a handle, to be held by the user while operating the dental tool from which motive power is supplied to move the endodontic instrument.

The term "remote pump" as used herein, refers to a pump which is remote of the endodontic device (1). The signal communication between the endodontic device (1) and the remote pump is performed wireless.

Gear

Preferably, the gear (110) is designed as a bevel gear, and more preferably it is a steel bevel gear. An embodiment according to the invention is related to a device (10), wherein the gear (110) is a steel bevel gear (115).

Thus, an embodiment according to the invention is directed to a device (10) for driving an endodontic file head (500) of an endodontic device (1) and operating a remote pump, the device comprising:

a steel bevel gear (115) for the connection with the endodontic file head (500); a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

The gear can be made of any material. Preferably, the gear is made of iron or iron alloy. Preferably, the iron alloy contains martensite as a grain structure. It is preferred if the gear is made of a ferromagnetic material. The gear (110) is preferably made of an AISI/SAE 440C annealed QQ-S-763 Class 440C condition A.

Drive Shaft

The drive shaft (120) can be composed of any material. The material is preferably not ferromagnetic. Preferably, the drive shaft (120) is composed of iron or iron alloy, more preferably iron alloy. The iron alloy can be steel, and more preferably stainless steel. It is preferred if the iron or iron alloy is not ferromagnetic. The steel is thus preferably an austenite, and more preferably stainless steel austenite. The steel can be a chromium-nickel steel, preferably AISI 316 (SAE 316). Still more preferably, the steel is AISI 316. Most preferably, the drive shaft (120) is made of an AISI 316 annealed stainless steel bar.

Bearing

The drive shaft (120) can contain at least one bearing (130) for the improvement of the rotational motion. The bearing (130) can be composed of any material.

The material is preferably not ferromagnetic. Preferably, the bearing (130) is composed of iron or iron alloy, more preferably iron alloy. The iron alloy can be steel, and more preferably stainless steel. It is preferred if the iron or iron alloy is not ferromagnetic. The steel is thus preferably an austenite, and more preferably austenitic stainless steel. The steel can be a chromium-nickel steel, preferably AISI 316 (SAE 316). Still more preferably, the steel is AISI 316. Most preferably, the bearing (130) is made of an AISI 316 annealed stainless steel bar.

The at least one bearing (130) is preferably positioned between the gear (110) and the magnet holding means (200).

Bearing Spacer

In case of at least two bearings (130), the bearings are preferably spatial separated by a bearing spacer (140).

More preferably, the device (10) according to the invention contains two bearings (130), wherein the two bearings (130) are positioned between the gear (110) and the magnet holding means (200), and wherein the two bearings (130) are spatially separated by a bearing spacer (140). The bearing spacer (140) can be made of any material. Preferably, the bearing spacer is made of a polymer. Preferably, the polymer is resistant of aqueous acids, aqueous bases and/or alcohols. More preferably, the polymer is resistant to aqueous acids namely hydrochloric acid and phosphoric acids. The polymer can be a thermosetting polymer (thermoset) or thermosoftening plastic (thermoplastic). Preferably, the polymer is an organic polymer. The polymer can be selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketoneketone (PEKEKK), polyethersulfone, polyethylene, polysuccinimide, polybismaeinimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, styrene-butadiene-styrene, epoxy resin, and phenol formaldehyde resins (phenolic resins). Preferably, the polymer is selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketoneketone (PEKEKK), polyethersulfone, polyethylene, polysuccinimide, polybismaleimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, and styrene-butadiene-styrene. More preferably, the polymer is selected from the group comprising or consisting of acrylonitrile butadiene styrene copolymer (ABS), acrylonitrile styrene (ANS), polyphthalamide, poly(ethene-co-tetrafluoroethene), polycarbonate, polyethylene, polyimide, polystyrene, and polyvinyl chloride. Still more preferably, the polymer is selected from the group comprising or consisting of acrylonitrile butadiene styrene copolymer (ABS), acrylonitrile styrene (ANS), polyphthalamide, and polycarbonate. The polymer is most preferably acrylonitrile butadiene styrene copolymer (ABS).

Internal Magnetic Fluency Closure—Voltage Level

The generation of a voltage being high enough to operate the transmitter within a device as small as the endodontic device (1) is challenging. The space in an endodontic device is limited which restricts the dimensions of the voltage generating parts, such as the thickness of the coil elements and the number of magnets. It is particularly difficult to provide a voltage of 1.7 V in the dimension of the endodontic device (1).

An embodiment according to the invention is directed to a device (10), wherein the first cylindrical (310) element and the second cylindrical element (350) comprises a metal.

Therefore, an embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising a metal surrounding the coil (410); a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500); a drive shaft (120) for rotating the gear (110) and for rotating at least one magnet (210);

a first cylindrical element (310) comprising a metal surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising a metal surrounding the coil (410); a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

By the first and second cylindrical element (310) and (350) the magnetic flux is controlled and concentrated on the coil (410), in particular on the wires of the coil (410) that cross said flux, i.e. the magnetic flux does not spread over the whole device (10), and is restricted to the area of the coil (410) so that the efficiency of the electrical current generation increases (efficient energy generation). In particular, ferromagnetic material such as iron or iron alloy is suitable to increase said effect.

In a preferred embodiment, the device (10) for driving an endodontic file head (500) of an endodontic device (1) and operating a remote pump comprises: a steel bevel gear (115) for the connection with the endodontic file head (500); a drive shaft (120) for rotating the gear (110) and for rotating at least one magnet (210);

a first cylindrical element (310) comprising a metal surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

An embodiment according to the invention is related to a device (10), wherein the metal is an iron alloy.

Thus, an embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

Preferably, the device comprises:

a steel bevel gear (115) for the connection with the endodontic file head (500); a drive shaft (120) for rotating the gear (110) and for rotating at least one magnet (210);

a first cylindrical element (310) comprising an iron alloy surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

The amount of the carbon in the iron alloy of the first cylindrical element (310) can be up to 0.2 wt %, preferably 0.15 wt %, and most preferably up to 0.1 wt %. In other words, the amount of the carbon in the iron alloy of the first cylindrical element (310, 310) is lower than 0.2 wt % carbon, more preferably lower than 0.15 wt % carbon, still more preferably lower than 0.1 wt % carbon.

The amount of the carbon in the iron alloy of the second cylindrical element (350) can be up to 0.2 wt %, preferably 0.15 wt %, and most preferably up to 0.1 wt %. In other words, the amount of the carbon in the iron alloy of the second cylindrical element (350) is lower than 0.2 wt % carbon, more preferably lower than 0.15 wt % carbon, still more preferably lower than 0.1 wt % carbon.

Thus, an embodiment according to the invention is directed to a device (10), wherein first cylindrical element (310) and/or the second cylindrical element (350) is made of an iron alloy, wherein the iron alloy contains carbon in an amount up to 0.2 wt %.

Thus, an embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and wherein said iron alloy contains carbon in an amount up to 0.2 wt %.

Preferably, the device (10) for driving an endodontic file head (500) of an endodontic device (1) and operating a remote pump, comprises:

a steel bevel gear (115) for the connection with the endodontic file head (500); a drive shaft (120) for rotating the gear (110) and for rotating at least one magnet (210);

a first cylindrical element (310) comprising an iron alloy surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and wherein said iron alloy contains carbon in an amount up to 0.2 wt %.

It is preferred if the material of the first cylindrical element (310) and/or second cylindrical element (350) is ferromagnetic.

Moreover, the material used for the first cylindrical element (310) and/or second cylindrical element (350) should preferably have a ferritic structure.

For example, the steel AISI 1008 can be used as a material for the first cylindrical element (310) and/or second cylindrical element (350).

Preferably, the device comprises:

a steel bevel gear (110) for the connection with the endodontic file head (500); a drive shaft (120) for rotating the gear (110) and for rotating at least one magnet (210);

a first cylindrical element (310) comprising an iron alloy surrounding the drive shaft (120);

a rotatable magnet holding means (200) surrounding the first cylindrical element (310);

at least one magnet (210) fixed in the rotatable magnet holding means (200); a coil (410) surrounding the rotatable magnet holding means (200);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and wherein said iron alloy contains carbon in an amount up to 0.2 wt %.

Magnet Holding Means and Magnets—Voltage Level

An embodiment according to the invention is related to a device (10), wherein the magnet holding means (200) is a magnetic separator (205).

Thus, an embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and wherein said iron alloy contains carbon in an amount up to 0.2 wt %.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and wherein said iron alloy contains carbon in an amount up to 0.2 wt %.

An embodiment according to the invention is directed to a device (10), wherein the device contains 1, 2, 3, 4, 5, 6, 7, 8, 9, 10, 11, 12, 13, 14, 15, or 16 magnets. Preferably, the device contains 2, 4, 6, 8, 10, 12, 14, or 16 magnets. More preferably, the device contains 4, 6, 8, 10, or 12 magnets. Still more preferably, the device contains 6, 8, or 10 magnets. More preferably, the device contains at least 2 magnets, still more preferably 4 magnets, still more preferably 6 magnets, and still more preferably 8 magnets. Most preferably, the device (10) contains 8 magnets.

Thus, an embodiment of the invention is related to a device (10) for driving an endodontic file head (500) of an endodontic device (1) and for operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

- a gear (110) for the connection with the endodontic file head (500);
- a drive shaft (120) for rotating the gear (110) and for rotating at least one magnet (210);
- a first cylindrical element (310) comprising an iron alloy surrounding the drive shaft (120);
- a rotatable magnet separator (205) surrounding the first cylindrical element (310);
- eight magnets (210) fixed in the rotatable magnet separator (205);
- a coil (410) surrounding the rotatable magnet separator (205);
- a second cylindrical element (350) comprising an iron alloy surrounding the coil (410);
- a central processing unit (420);
- an inner encoder (430) on the central processing unit (420) for measuring the velocity of the drive shaft (120);
- a transmitter (450);
- an antenna (460) for sending a signal to a remote pump (700);
- at least one sleeve (150) interlinked with the drive shaft (120) for moving the drive shaft (120) by a motorized power handle (600); and wherein said iron alloy contains carbon in an amount up to 0.2 wt %.

Preferably, the device (10) for driving an endodontic file head (500) of an endodontic device (1) and operating a remote pump, comprises:

- a steel bevel gear (115) for the connection with the endodontic file head (500);
- a drive shaft (120) for rotating the gear (110) and for rotating at least one magnet (210);
- a first cylindrical element (310) comprising a metal surrounding the drive shaft (120);
- a rotatable magnet separator (205) surrounding the first cylindrical element (310);
- eight magnets (210) fixed in the rotatable magnet separator (205);
- a coil (410) surrounding the rotatable magnet separator (205);
- a second cylindrical element (350) comprising a metal surrounding the coil (410);
- a central processing unit (420);
- an inner encoder (430) on the central processing unit (420) for measuring the velocity of the drive shaft (120);
- a transmitter (450);
- an antenna (460) for sending a signal to a remote pump (700);
- at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

- a steel bevel gear (115) for the connection with the endodontic file head (500);
- a drive shaft (120) for rotating the gear (110) and for rotating at least one magnet (210);
- a first cylindrical element (310) comprising an iron alloy surrounding the drive shaft (120);
- a rotatable magnet separator (205) surrounding the first cylindrical element (310);

- eight magnets (210) fixed in the rotatable magnet separator (205);
- a coil (410) surrounding the rotatable magnet separator (205);
- a second cylindrical element (350) comprising an iron alloy surrounding the coil (410);
- a central processing unit (420);
- an inner encoder (430) on the central processing unit (420) for measuring the velocity of the drive shaft (120);
- a transmitter (450);
- an antenna (460) for sending a signal to a remote pump (700);
- at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

- a steel bevel gear (115) for the connection with the endodontic file head (500);
- a drive shaft (120) for rotating the gear (110) and for rotating at least one magnet (210);
- a first cylindrical element (310) comprising an iron alloy surrounding the drive shaft (120);
- a rotatable magnet separator (205) surrounding the first cylindrical element (310);
- eight magnets (210) fixed in the rotatable magnet separator (205);
- a coil (410) surrounding the rotatable magnet separator (205);
- a second cylindrical element (350) comprising an iron alloy surrounding the coil (410);
- a central processing unit (420);
- an inner encoder (430) on the central processing unit (420) for measuring the velocity of the drive shaft (120);
- a transmitter (450);
- an antenna (460) for sending a signal to a remote pump (700);
- at least one sleeve (150) interlinked with the drive shaft (120) for moving the drive shaft (120) by a motorized power handle (600); and wherein said iron alloy contains carbon in an amount up to 0.2 wt %.

A preferred embodiment according to the invention is directed to a device (10), wherein the at least one magnet (210) is made of an alloy.

Therefore, a preferred embodiment according to the invention is related to a device (10) for driving an endodontic file head (500) of an endodontic device (1) and operating a remote pump, the device comprising:

- a gear (110) for the connection with the endodontic file head (500);
- a drive shaft (120) for rotating the gear (110) and for rotating at least one magnet (210);
- a first cylindrical element (310) surrounding the drive shaft (120);
- a rotatable magnet holding means (200) surrounding the first cylindrical element (310);
- at least one magnet (210) fixed in the rotatable magnet holding means (200);
- a coil (410) surrounding the rotatable magnet holding means (200);
- a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and wherein the at least one magnet (210) is made of an alloy.

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of an alloy.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of an alloy.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt % and wherein the at least one magnet (210) is made of an alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of an alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of an alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt % and wherein the at least one magnet (210) is made of an alloy.

A more preferred embodiment according to the invention is related to a device (10), wherein the at least one magnet (210) is made of a neodymium-iron-boron alloy.

A still more preferred embodiment according to the invention is related to a device (10), wherein the at least one magnet (210) is made of a nickel-plated neodymium-iron-boron alloy.

Thus, a still more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and wherein the at least one magnet (210) is made of nickel-plated neodymium-iron-boron alloy.

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of a nickel-plated neodymium-iron-boron alloy.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of a nickel-plated neodymium-iron-boron alloy.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt % and wherein the at least one magnet (210) is made of a nickel-plated neodymium-iron-boron alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of a nickel-plated neodymium-iron-boron alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least one magnet (210) is made of a nickel-plated neodymium-iron-boron alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least one magnet (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt % and wherein the at least one magnet (210) is made of a nickel-plated neodymium-iron-boron alloy.

In embodiments of the inventive device (10) comprising more than one magnet (210), the at least two magnets (210) can be symmetrically arranged along the circumference of drive shaft (120), which provides strong magnetic flux loops.

Symmetrically arranged means that the magnets are equidistantly positioned in the magnet holding means (200). Moreover, neighbouring (adjacent) magnets can have opposite polarity, which also provides strong magnetic flux loops. More preferably, the at least two magnets (210) are arranged symmetrically along the circumference of the drive shaft (120), and the neighbouring magnets have opposite polarity, which further increases the magnetic flux loops.

Thus, an embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600);

and wherein the at least two magnets (210) are arranged symmetrically along the circumference of the drive shaft (120) and/or the neighbouring magnets have opposite polarity.

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the eight magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the eight magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the eight magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210); a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt % and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600), wherein the at least two magnets (210) are symmetrically arranged around the drive shaft (120) and/or the neighbouring magnets have opposite polarity, and wherein the at least one magnet (210) is made of a nickel-plated neodymium-iron-boron alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the eight magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the eight magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the eight magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt % and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600), wherein the at least two magnets (210) are symmetrically arranged around the drive shaft (120) and/or the neighbouring magnets have opposite polarity, and wherein the at least one magnet (210) is made of a nickel-plated neodymium-iron-boron alloy.

A preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600);

and wherein the at least two magnets (210) are arranged symmetrically along the circumference of the drive shaft (120) and the neighbouring magnets have opposite polarity.

A still more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600);

and wherein the at least eight magnets (210) are arranged symmetrically along the circumference of the drive shaft (120) and/or the neighbouring magnets have opposite polarity.

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205).

A still more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600);

and wherein the at least eight magnets (210) are arranged symmetrically along the circumference of the drive shaft (120) and the neighbouring magnets have opposite polarity.

A still more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600);

and the eight magnets (210) are arranged symmetrically along the circumference of the drive shaft (120) and/or the neighbouring magnets have opposite polarity.

A still more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600);

and the eight magnets (210) are arranged symmetrically along the circumference of the drive shaft (120) and the neighbouring magnets have opposite polarity.

The magnet holding means (200), particularly the magnetic separator (205), can be made of any material, which is not ferromagnetic, paramagnetic or diamagnetic. The material is preferably a polymer. Preferably, the polymer is resistant of aqueous acids, aqueous bases and/or alcohols. More preferably, the polymer is resistant to aqueous acids namely hydrochloric acid and phosphoric acids. The polymer can be a thermosetting polymer (thermoset) or thermosoftening plastic (thermoplastic). Preferably, the polymer is an organic polymer. The polymer can be selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketoneketone (PEKEKK), polyethersulfone, polyethylene, polysuccinimide, polybismaeinimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, styrene-butadiene-styrene, epoxy resin, and phenol formaldehyde resins (phenolic resins).

Preferably, the polymer is selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketoneketone (PEKEKK), polyethersulfone, polyethylene, polysuccinimide, polybismaleimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, and styrene-butadiene-styrene. More preferably, the polymer is selected from the group comprising or consisting of acrylonitrile butadiene styrene copolymer (ABS), acrylonitrile styrene (ANS), polyphthalamide, poly(ethene-co-tetrafluoroethene), polycarbonate, polyethylene, polyimide, polystyrene, and polyvinyl chloride. Still more preferably, the polymer is selected from the group comprising or consisting of acrylonitrile butadiene styrene copolymer (ABS), acrylonitrile styrene (ANS), polyphthalamide, and polycarbonate. The polymer is most preferably acrylonitrile butadiene styrene copolymer (ABS).

Printed Circuit Board (PCB)

An embodiment according to the invention is related to a device (10), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120). More precisely, the time that passes between threshold crossing of the sine wave being generated in the coil is proportional to the rotational speed of the drive shaft.

Therefore, an embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt %.

Preferably, the device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600), and wherein the at least one magnet (210) is made of a nickel-plated neodymium-iron-boron alloy.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least two magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120); an antenna (460) for sending a signal to a remote pump (700);

at least one sleeve (150) interlinked with the drive shaft (120) for moving the drive shaft (120) by a motorized power handle (600) and wherein the at least two magnets (210) are symmetrically arranged around the drive shaft (120) and/or the neighbouring magnets have opposite polarity.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

eight magnets (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120); an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120); an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120); an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120); an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

eight magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an inner encoder (430) on the central processing unit (420), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120);

an antenna (460) for sending a signal to a remote pump (700);

at least one sleeve (150) interlinked with the drive shaft (120) for moving the drive shaft (120) by a motorized power handle (600).

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising an iron alloy surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising an iron alloy surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120); an antenna (460) for sending a signal to a remote pump (700);

at least one sleeve (150) interlinked with the drive shaft (120) for moving the drive shaft (120) by a motorized power handle (600); wherein said iron alloy contains carbon in an amount up to 0.2 wt %.

Preferably, the device (10) for driving an endodontic file head (500) of an endodontic device (1) and operating a remote pump, comprises:

a steel bevel gear (115) for the connection with the endodontic file head (500);

a drive shaft (120) for rotating the gear (110) and for rotating at least one magnet (210);

a first cylindrical element (310) comprising a metal surrounding the drive shaft (120);

a rotatable magnet separator (205) surrounding the first cylindrical element (310);

at least two magnets (210) fixed in the rotatable magnet separator (205);

a coil (410) surrounding the rotatable magnet separator (205);

a second cylindrical element (350) comprising a metal surrounding the coil (410);

a central processing unit (420);

an inner encoder (430) on the central processing unit (420) for measuring the velocity of the drive shaft (120);

a transmitter (450);

an inner encoder (430) on the central processing unit (420) for measuring the velocity of the drive shaft (120), wherein the inner encoder (430) on the central processing (420) unit for measuring the velocity of the drive shaft is implemented by means of the central processing unit (420) counting the time that passes between threshold crossing of the sine wave being generated in the coil (410), which is proportional to the velocity of the drive shaft (120); an antenna (460) for sending a signal to a remote pump (700);

at least one sleeve (150) interlinked with the drive shaft (120) for moving the drive shaft (120) by a motorized power handle (600), and wherein the at least one magnet (210) is made of a nickel-plated neodymium-iron-boron alloy.

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205). Preferably, the device comprises at least two magnets (210), more preferably eight magnets (210). Preferably, the magnet(s) (210) are made of a nickel-plated neodymium-iron-boron alloy.

The AC voltage that is generated by the coil (alternating polarity sine wave at a frequency proportional to the rotation speed) goes into the central processing unit (420) preferably via a protection circuit to avoid reaching central processing unit input limitations. Said input is used to measure the rotation speed. The AC voltage is rectified preferably by means of diodes and capacitors in order to feed the DC-DC circuit. The rotation speed is thus measured by using the AC voltage of the coil, while the power supply circuits use the rectified DC voltage.

An embodiment according to the invention is directed to a device (10), wherein the coil (410), the central processing unit (420), the inner encoder (430), the transmitter (450), and the antenna (460) are on a printed circuit board (400). In order to reduce the size of an endodontic device (1) or of the device (10), the integration of the coil into the printed circuit board (400) is essential since no space for regular coils is present in an endodontic device (1) or of the device (10) having a reduced volume is available. In addition, coils are easier to manufacture when being printed on a printed circuit board in comparison to conventional thin wire winding technology. Moreover, assembly of the device (10) is facilitated by using the PCB (400) having the coil (410) printed on it, instead of a coil custom made by wire winding. Also a coil custom made by wire winding is less reliable than a coil (410) printed in multiple layers on a printed circuit board (400).

Preferably, the coil is printed on the printed circuit board.

An AC voltage is induced in the coil printed on the printed circuit board (400) by rotation of the at least one magnet in the rotatable magnet holding means (200). To this extent, adjacent magnets of the at least one magnet (210) fixed in the rotatable magnet holding means (200) are of opposite polarity, thereby generating alternating current. The coil therefore acts as an inductor on the PCB. Thus, the coil is preferably made of an electrically conductive material, such as copper. The cross section of the coil has preferably the shape of a rectangle.

The number of coils can be in the range of 3 to 10, preferably in the range of 4 to 8, and most preferably in the range of 4 to 6. A lower number of coils as stated above adversely affects the performance since not enough power is generated for activating the current electronics. A larger number of coils as stated above is more costly to produce and a flexible PCB with such a number of coils is difficult to place into the inventive device. Preferably, the printed circuit board (400) comprises six coils. Preferably, the coils are printed on top of each other so that they are located exactly at the same position on the printed circuit board. Preferably, the printed circuit board (400) comprises six coils, which are printed on top of each other.

The coils are printed as several layers on the printed circuit board. Preferably, each coil is printed as an individual layer on the PCB (400). The number of layers can be in the range of 3 to 10, preferably in the range of 4 to 8, and most preferably in the range of 4 to 6. Preferably, the printed circuit board (400) comprises six layers.

The printed coil can be of any pattern, such as wavy line pattern, S-shape pattern, snake shape pattern, rectangular snake shape pattern, or square wave pattern. Since the voltage induction is most efficient in sections of the coil, which are oriented parallel to the axis of rotation of the drive shaft (120) and the rotatable magnet holding means (200), those patterns are preferred that result in the largest sections of the coil, which are oriented in parallel to the axis of rotation. Preferably, the coil comprises a square wave pattern as depicted in FIG. 15. Preferably, the coil is not spiral shaped.

In a particular embodiment, the coil (410) is square wave shaped, wherein the shape is defined by the parameters A, B and C (see FIG. 16). A represents closest distance between the center line B and the square wave pattern and P represents the length of each segment of the square wave pattern. Preferably, P lies in the range of 3 mm to 7 mm, more preferably in the range of 4 mm to 6.5 mm and most preferably in the range of 5 mm to 6 mm. In a preferred embodiment, P is about 5.55 mm. Preferably, A lies in the range of 2 mm to 6 mm, more preferably in the range of 2.5 mm to 5 mm and most preferably in the range of 3 mm to 4 mm. In a preferred embodiment, A is about 3 mm.

In a particularly preferred embodiment, A is about 3 mm and P is about 5.55 mm. Preferably, the square wave shaped coil consists of 7 to 15 periods (windings), more preferably of 8 to 14 periods, more preferably of 9 to 13 periods, and most preferably of 10 to 12 periods. Particularly preferred is a square wave shaped coil of 11 periods. In one embodiment, the number of the periods of the square wave shaped coil is identical to the number of the at least one magnet (210) fixed in the rotatable magnet holding means (200).

As mentioned above, for a more efficient voltage induction in the coil, a larger value of A is preferred. Also, for a more efficient voltage induction in the coil, a value of P is preferred which is identical or nearly identical to the distance of the adjacent magnets of the at least one magnet (210) fixed in the rotatable magnet holding means (200).

The effective length of each printed coil can be in the range of 1000 mm to 1800 mm, preferably in the range of 1200 mm to 1600 mm, more preferably 1300 mm to 1500 mm. Preferably, the effective length of each printed coil is about 1420 mm.

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600); and wherein the coil (410), the central processing unit (420), the inner encoder (430), the transmitter (450), and the antenna (460) are on a printed circuit board (400).

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205). Preferably, the device comprises at least two magnets (210), more preferably eight magnets (210). Preferably, the magnet(s) (210) are made of a nickel-plated neodymium-iron-boron alloy.

Preferably, the inventive device (10) for driving an endodontic file head (500) of an endodontic device (1) and operating a remote pump, comprises:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600); and wherein the coil (410), the central processing unit (420), the inner encoder (430), the transmitter (450), and the antenna (460) are on a printed circuit board (400), wherein printed circuit board (400) comprises 4 to 6 coils, preferably 6 coils.

An embodiment according to the invention is directed to a device (10), wherein the coil (410), the central processing unit (420), the inner encoder (430), the transmitter (450), and the antenna (460) are on a flexible printed circuit board (400). Preferably, the printed circuit board (400) is made of a flexible material, such as polyamide.

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700); and at least one sleeve (150) interlinked with the drive shaft (120) for moving the drive shaft (120) by a motorized power handle (600); and wherein the coil (410), the central processing unit (420), the inner encoder (430), the transmitter (450), and the antenna (460) are on a flexible printed circuit board (400).

An embodiment according to the invention is related to a device (10), wherein the device contains a DC-DC converter (470).

Hence, an embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470); and at least one sleeve (150) interlinked with the drive shaft (120) for moving the drive shaft (120) by a motorized power handle (600).

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205). Preferably, the device comprises at least two magnets (210), more preferably eight magnets (210). Preferably, the magnet(s) (210) are made of a nickel-plated neodymium-iron-boron alloy.

An embodiment according to the invention is directed to a device (10), wherein the DC-DC converter (470) contains a maximum power point tracking algorithm. Thereby, the voltage level can be further improved.

The concept called "Maximum Power Point Tracking" (MPPT) is commonly known by a skilled person in the art. The concept is: to efficiently harvest energy from the coil, the device should neither seek for high current, nor high voltage, but rather seek for maximum power, which is the product of the current multiplied by the voltage. The DC-DC converter (470), which is fed by the coil energy, sweeps through certain ranges of current drawn from the coil, causing changes in the coil voltage. (In case of a low current, a light load exists and the voltage is higher. In case of a high current, a heavy load exists, and the voltage is lower). The power (product of current and voltage) is calculated along this sweep, the maximum power is recorded, and the DC-DC converter goes back to consume the current that corresponds to the maximum power point. During the device operation, the DC-DC converter keeps tracking this maximum power point, by actively changing the current consumed from the source (coil) and monitoring the voltage.

Thus, in one embodiment, the DC-DC converter (470) comprises a MPPT charge controller.

Hence, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (110) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470), wherein the DC-DC converter (470) contains a maximum power point tracking algorithm; and at least one sleeve (150) interlinked with the drive shaft (120) for moving the drive shaft (120) by a motorized power handle (600).

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205). Preferably, the device comprises at least two magnets (210), more preferably eight magnets (210). Preferably, the magnet(s) (210) are made of a nickel-plated neodymium-iron-boron alloy.

Outer Ring Positioner

The central processing unit (420), the inner encoder (430), the transmitter (450), and the antenna (460) can be surrounded by an outer ring positioner (1000). This outer ring positioner (1000) will cover and protect said components. In case the coil (410), central processing unit (420), the inner encoder (430), the transmitter (450), and the antenna (460) are on one printed circuit board (400), the outer ring positioned (1000) surrounds part of the PCB apart from the coil part. The outer ring positioned can be made of any material. Preferably, the material is a polymer. Preferably, the polymer is resistant of aqueous acids, aqueous bases and/or alcohols. More preferably, the polymer is resistant to aqueous acids namely hydrochloric acid and phosphoric acids. The polymer can be a thermosetting polymer (thermoset) or thermosoftening plastic (thermoplastic). Preferably, the polymer is an organic polymer. The polymer can be selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretherketone (PEEEK), polyetheretherketoneketone (PEEKK), polyetherketone-etherketoneketone (PEKEKK), polyethersulfone, polyethylene, polysuccinimide, polybismaleimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, styrene-butadiene-styrene, epoxy resin, and phenol formaldehyde resins (phenolic resins). Preferably, the polymer is selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly (ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketone-ketone (PEKEKK), polyethersulfone, polyethylene, polysuccinimide, polybismaleimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, and styrene-butadiene-styrene. More preferably, the polymer is selected from the group comprising or consisting of acrylonitrile butadiene styrene copolymer (ABS), acrylonitrile styrene (ANS), polyphthalamide, poly(ethene-co-tetrafluoroethene), polycarbonate, polyethylene, polyimide, polystyrene, and polyvinyl chloride. Still more preferably, the polymer is selected from the group comprising or consisting of acrylonitrile butadiene styrene copolymer (ABS), acrylonitrile styrene (ANS), polyphthalamide, and polycarbonate. The polymer is most preferably acrylonitrile butadiene styrene copolymer (ABS).

Battery

An embodiment according to the invention is directed to a device (10), wherein the device further comprises at least one battery (800).

Thus, an embodiment according to the invention is related to a device (10) for driving an endodontic file head (500) of an endodontic device (1) and operating a remote pump, the device comprising:
- a gear (110) for the connection with the endodontic file head (500);
- a drive shaft (120) for rotating the gear (100) and for rotating at least one magnet (210);
- a first cylindrical element (310) surrounding the drive shaft (120);
- a rotatable magnet holding means (200) surrounding the first cylindrical element (310);
- at least one magnet (210) fixed in the rotatable magnet holding means (200);
- a coil (410) surrounding the rotatable magnet holding means (200);
- a second cylindrical element (350) surrounding the coil (410);
- a central processing unit (420);
- an inner encoder (430) on the central processing unit (420) for measuring the velocity of the drive shaft (120);
- a transmitter (450);
- an antenna (460) for sending a signal to a remote pump (700);
- at least one sleeve (150) interlinked with the drive shaft (120) for moving the drive shaft (120) by a motorized power handle (600); and
- at least one battery (800).

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205). Preferably, the device comprises at least two magnets (210), more preferably eight magnets (210). Preferably, the magnet(s) (210) are made of a nickel-plated neodymium-iron-boron alloy.

The battery can help to reduce the waiting period before using the device (10) by 1.0 to 1.5 milliseconds, which is significant for surgeon.

As mentioned above, the space in an endodontic device is limited in a manner that the generation of a high voltage relative to the dimension is challenging. In order to charge a battery, a voltage of 4.2 V is necessary. Thus, it is particularly difficult to provide a voltage of 4.2 V in the dimension of the endodontic device (1). Reducing the waiting period before using the device (10) by 1.0 to 1.5 milliseconds by faster charging a battery is significant for a surgeon.

A further embodiment according to the invention is related to a device (10), wherein the device (10) further comprises at least one rechargeable battery (810). Therefore, a further embodiment according to the invention is directed to a device (10) for driving an endodontic file head (500) of an endodontic device (1) and operating a remote pump, the device comprising:
- a gear (110) for the connection with the endodontic file head (500);
- a drive shaft (120) for rotating the gear (100) and for rotating at least one magnet (210);
- a first cylindrical element (310) surrounding the drive shaft (120);
- a rotatable magnet holding means (200) surrounding the first cylindrical element (310);
- at least one magnet (210) fixed in the rotatable magnet holding means (200);
- a coil (410) surrounding the rotatable magnet holding means (200);
- a second cylindrical element (350) surrounding the coil (410);
- a central processing unit (420);
- an inner encoder (430) on the central processing unit (420) for measuring the velocity of the drive shaft (120);
- a transmitter (450);
- an antenna (460) for sending a signal to a remote pump (700);
- at least one sleeve (150) interlinked with the drive shaft (120) for moving the drive shaft (120) by a motorized power handle (600); and
- at least one rechargeable battery (810).

Thus, the energy generated by the use of device (10) can be used for another treatment in order to reduce the waiting period before using the device (10) by 1.0 to 1.5 milliseconds, which is significant for surgeon.

In a preferred embodiment according to the invention, at least one battery (800) is not fixed on the printed circuit board (400) or flexible printed circuit board (405) of the device (10). Thus, a preferred embodiment according to the invention is directed to a device (10) for driving an endodontic file head (500) of an endodontic device (1) and operating a remote pump, the device comprising:
- a gear (110) for the connection with the endodontic file head (500);
- a drive shaft (120) for rotating the gear (100) and for rotating at least one magnet (210);
- a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and at least one battery (800), wherein the battery is not fixed on the printed circuit board (400).

In another preferred embodiment according to the invention, at least one rechargeable battery (810) is not fixed on the printed circuit board (400) of the device (10). Thus, another preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and at least one rechargeable battery (810), wherein the rechargeable battery (810) is not fixed on the printed circuit board (400).

The printed circuit board (400) may contain a battery connection (850) if a battery is used.

The printed circuit board (400) may contain a capacitor connection (880) if a capacitor (860) is used.

The rechargeable battery can be a lithium-ion polymer battery also called lithium polymer battery, which utilizes a polymer electrolyte. High conductivity semisolid gels or polymers form this electrolyte. These batteries provide higher specific energy than other lithium battery types. The weight of the device (10) can be reduced by using a lithium-ion polymer battery. The voltage of the lithium-ion polymer battery is preferably between 2.7 V to 3.7 V in a discharged state, more preferably 3.0 to 3.7V, still more preferably 3.5 V to 3.7 V, and still more preferably 3.7 V. The battery has preferably a capacity of 9 mAh.

In case of the presence of a rechargeable battery (810), the device (10) further comprises at least one battery charger (900).

Therefore, a further embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600);

at least one rechargeable battery (810), and at least one battery charger (900).

Preferably, a DC-DC converter (470) can charge the battery, and thus function as a battery charger (900). The DC-DC converter (470) comprises then two outputs, one for the battery and one output for the transmitter. Power can be provided to the transmitter from one of the available power sources: either the coil or the battery, with the coil having precedence over the battery. Most preferably, the DC-DC converter (470) is adapted in such a way that if the coil has enough power for both, it will be the power source for battery charging and the transmitter, otherwise, the battery will power the transmitter.

Thus, a preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one rechargeable battery (810), and a battery charger (900), wherein the battery charger is the DC-DC converter (470) being adapted to function as a battery charger.

A preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one rechargeable battery (810), and a battery charger (900), wherein the battery charger is the DC-DC converter (470) being adapted to function as a battery charger, and wherein power is provided to the transmitter (450) by the rechargeable battery (810) or the coil (410).

Thus, a preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one rechargeable battery (810), and a battery charger (900), wherein the battery charger is a DC-DC converter (470) being adapted to function as a battery charger.

A more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one rechargeable battery (810), and a battery charger (900), wherein the battery charger is a DC-DC converter (470) being adapted to function as a battery charger, and wherein power is provided to the transmitter (450) by the rechargeable battery (810) or the coil (410).

A still more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one rechargeable battery (810), and a battery charger (900), wherein the battery charger is the DC-DC converter (470) being adapted to function as a battery charger, wherein power is provided to the transmitter (450) by the rechargeable battery (810) or the coil (410), and wherein the DC-DC converter (470) is adapted in such a way that if the coil has enough power for both, it will be the power source for battery charging and the transmitter, otherwise, the battery will power the transmitter.

The use of the battery voltage does not influence the measuring of the rotation speed since the AC voltage is used for this purpose while the battery produces a DC voltage.

Another embodiment according to the invention is directed to a device (10), wherein the device does not comprise a battery (800) or a rechargeable battery (810) (see FIGS. 9-11).

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and no battery (800).

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205). Preferably, the device comprises at least two magnets (210), more preferably eight magnets (210). Preferably, the magnet(s) (210) are made of a nickel-plated neodymium-iron-boron alloy.

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and no rechargeable battery (810).

Preferably, the gear (110) is a steel bevel gear (115). Preferably, the first cylindrical (310) element and the second cylindrical element (350) comprises a metal. Preferably, the first cylindrical (310) element and the second cylindrical element (350) comprises an iron alloy. Preferably, said iron alloy contains carbon in an amount up to 0.2 wt %. Preferably, the magnet holding means (200) is a magnetic separator (205). Preferably, the device comprises at least two magnets (210), more preferably eight magnets (210). Preferably, the magnet(s) (210) are made of a nickel-plated neodymium-iron-boron alloy.

Capacitor

In an alternative embodiment, the device (10) according to the invention further comprises at least one capacitor (860).

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and at least one capacitor (860).

The one or more capacitors serve as power storage (power capacitor), like the battery (800), and can help to reduce the waiting period before using the device (10) by 1.0 millisecond to 1.5 milliseconds, which is significant for surgeon. Thus, in preferred embodiments of the device (10), the battery (800) may be replaced by one or more capacitors (860).

The at least one capacitor (860) is preferably selected from, but not limited to: ceramic capacitors constructed of two or more alternating layers of ceramic and a metal layer acting as the electrodes, multilayer ceramic capacitors (MLCCs), or Tantalum polymer capacitors. Given the limited available space of device (10), a capacitor of high volumetric efficiency is particularly preferred. Volumetric efficiency quantifies the performance of energy stored per unit volume and is calculated by multiplying the capacitance (C) by the maximum voltage rating (V), divided by the volume.

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and at least one capacitor (860), wherein the at least one capacitor (860) is a ceramic capacitor.

Preferably, these embodiments do not comprise a battery (800).

Consequently, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and at least one capacitor (860), wherein the device (10) does not comprise a battery (800).

As mentioned above, the space in an endodontic device is limited in a manner that the generation of a high voltage relative to the dimension is challenging. In order to charge the capacitor, a voltage of 4.2 V is necessary. Thus, it is particularly difficult to provide a voltage of 4.2 V in the dimension of the endodontic device (1). Reducing the waiting period before using the device (10) by 1.0 to 1.5 milliseconds by faster charging a battery is significant for a surgeon.

Thus, the energy generated by the use of device (10) can be used for another treatment in order to reduce the waiting period before using the device (10) by 1.0 millisecond to 1.5 milliseconds, which is significant for surgeon. Therefore, it is preferred that the capacitor (860) has a capacitance of at least 400 µF, more preferably 415 µF, more preferably 430 µF and most preferably 450 µF.

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

61 a transmitter (450);

an antenna (460) for sending a signal to a remote pump (700);

at least one sleeve (150) interlinked with the drive shaft (120) for moving the drive shaft (120) by a motorized power handle (600); and at least one capacitor (860) having a capacitance of at least 450 µF.

Preferably, the at least one capacitor (860) has a capacitance in the range of 400 µF to 550 µF, more preferably in the range of 410 µF to 540 µF, more preferably in the range of 420 µF to 530 µF, more preferably in the range of 430 µF to 520 µF and most preferably in the range of 450 µF to 050 µF. Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and at least one capacitor (860) having a capacitance between 450 µF and 500 µF.

In one embodiment, the device (10) for driving an endodontic file head (500) of an endodontic device (1) and operating a remote pump comprises 2, 3, 4 or 5 capacitors (860). Preferably, the device (10) comprises three capacitors (860).

Thus, an embodiment according to the invention is related to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

at least one sleeve (150) interlinked with the drive shaft (120) for moving the drive shaft (120) by a motorized power handle (600); and three capacitors (860).

Preferably, the three capacitors have a total capacitance between 450 µF and 500 µF. In a preferred embodiment, the device (10) comprises a capacitor having a capacitance of 47 µF and two capacitors each having a capacitance of 220 µF.

Preferably, the at least one capacitor (860) is located on the printed circuit board (400) at the outer ring (1000). In embodiments of the device (10) comprising more than one capacitor, it is preferred that all capacitors are located on the printed circuit board (400) at the outer ring (1000). Thus, it is preferred that the at least one capacitor (860) has the same position as the battery (800) in FIGS. 5-8.

The printed circuit board (400) may contain a capacitor charger (870) if one or more capacitors are used.

Preferably, a DC-DC converter (470) can charge the capacitor, and thus function as a capacitor charger (870). The DC-DC converter (470) comprises then two outputs, one for the capacitor and one output for the transmitter. Power can be provided to the transmitter from one of the available power sources: either the coil or the capacitor, with the coil having precedence over the capacitor. Most preferably, the DC-DC converter (470) is adapted in such a way that if the coil has enough power for both, it will be the power source for capacitor charging and the transmitter, otherwise, the capacitor will power the transmitter.

Thus, a preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one capacitor (860), and a capacitor charger (870), wherein the capacitor charger is the DC-DC converter (470) being adapted to function as a capacitor charger.

A preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one capacitor (860), and a capacitor charger (870), wherein the capacitor charger is the DC-DC converter (470) being adapted to function as a capacitor charger, and wherein power is provided to the transmitter (450) by the capacitor (860) or the coil (410).

A still more preferred embodiment according to the invention is directed to a device (10) for driving an endodontic file head (500) of an endodontic device (1) and operating a remote pump, the device comprising:

a gear (110) for the connection with the endodontic file head (500);

a drive shaft (120) for rotating the gear (100) and for rotating at least one magnet (210);

a first cylindrical element (310) surrounding the drive shaft (120);

a rotatable magnet holding means (200) surrounding the first cylindrical element (310);

at least one magnet (210) fixed in the rotatable magnet holding means (200);

a coil (410) surrounding the rotatable magnet holding means (200);

a second cylindrical element (350) surrounding the coil (410);

a central processing unit (420);

an inner encoder (430) on the central processing unit (420) for measuring the velocity of the drive shaft (120);

a transmitter (450);

an antenna (460) for sending a signal to a remote pump (700);

a DC-DC converter (470);

at least one sleeve (150) interlinked with the drive shaft (120) for moving the drive shaft (120) by a motorized power handle (600);

at least one capacitor (860), and a capacitor charger (870), wherein the capacitor charger is the DC-DC converter (470) being adapted to function as a capacitor charger, wherein power is provided to the transmitter (450) by the capacitor (860) or the coil (410), and wherein the DC-DC converter (470) is adapted in such a way that if the coil has enough power for the transmitter and for charging the capacitor (860), the coil will be the power source for capacitor charging and the transmitter, otherwise, the capacitor will power the transmitter.

The use of the capacitor voltage does not influence the measuring of the rotation speed since the AC voltage is used for this purpose while the capacitor produces a DC voltage.

Sleeve (150)

The sleeve (150) for moving the drive shaft (120) by a motorized power handle (600) can be an ISO-type connector typical in the endodontic field. The connector can be composed of any material. The material is preferably not ferromagnetic. Preferably, the sleeve (150) is composed of iron or iron alloy, more preferably iron alloy. The iron alloy can be steel, and more preferably stainless steel. It is preferred if the iron or iron alloy is not ferromagnetic. The steel is thus preferably an austenite, and more preferably stainless steel austenite. The austenite can be AISI 316 (SAE 316). Still more preferably, the steel is AISI 316. Most preferably, the sleeve (150) is made of an AISI 316 annealed stainless steel bar.

Securing Cup

The sleeve (150) is connectable to a securing cup (160), wherein the securing cup (160) directly surrounds the part of the connector, and the securing cup (160) is positioned between the magnet holding means (200) and the sleeve (150). The securing cup can be made of any material. The material is preferably not ferromagnetic. Preferably, the securing cup (160) is composed of iron or iron alloy, more preferably iron alloy. The iron alloy can be steel, and more preferably stainless steel. It is preferred if the iron or iron alloy is not ferromagnetic. The steel is thus preferably an austenite, and more preferably stainless steel austenite. The steel can be a chromium-nickel steel, preferably AISI 316 (SAE 316). Still more preferably, the steel is AISI 316. Most preferably, the securing cup (160) is made of an AISI 316 annealed stainless steel bar.

Adapter

Further, the device (10) can contain an adapter (190) for connecting a motorized power handle (600) to the device (10). Preferably, an ISO type motor adaptor. In general, the adaptor can be made of any material. However, it is preferred if the material is non-ferromagnetic and/or non-paramagnetic as well as low-paramagnetic. The material can be aluminium or aluminium alloy, more preferably aluminium alloy, and still preferably A6061 aluminium alloy, and most preferably A6061-T6 aluminium alloy. The number of the aluminium alloy follows the UNS-numbering (Unified Numbering System for Metals and Alloys)

Furthermore, device (10) according to the invention can contain a spring (170). The spring can be positioned between the magnet holding mean (200) and the securing cap (160).

The spring (170) can be composed of steel. Preferably, the spring (170) is composed of stainless steel. More preferably, the spring (170) is made of spring steel. Still more preferably, the spring (170) is made of steel according to EN 10151:2002 or EN10270-3:2001 (DIN 17224). The spring serves to couple the sleeve (150) with the motorized power handle (600). Thereby, the spring pushes the sleeve (150) against the shaft of the motorized power handle (600) in order to create a mechanical engagement between the sleeve (150) and the shaft of the motorized power handle (600).

Housing

The housing (50) of the device (10) which encases the components of the device (10) according to the invention can be made of a polymer. Preferably, the polymer is resistant of aqueous acids, aqueous bases and/or alcohols. More Preferably, the polymer is resistant to aqueous acids namely hydrochloric acid and phosphoric acids. The polymer can be a thermosetting polymer (thermoset) or thermosoftening plastic (thermoplastic). Preferably, the polymer is an organic polymer. The polymer can be selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketoneketone (PEKEKK), polyethersulfone, polyethylene, polysuccinimide, polybismaleimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, styrene-butadiene-styrene, epoxy resin, and phenol formaldehyde resins (phenolic resins). Preferably, the polymer is selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketoneketone (PEKEKK), polyethersulfone, polyethylene, polysuccinimide, polybismaleimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, and styrene-butadiene-styrene. More preferably, the polymer is selected from the group comprising or consisting of acrylonitrile butadiene styrene copolymer (ABS), acrylonitrile styrene (ANS), polyphthalamide, poly(ethene-co-tetrafluoroethene), polycarbonate, polyethylene, polyimide, polystyrene, and polyvinyl chloride. Still more preferably, the polymer is selected from the group comprising or consisting of acrylonitrile butadiene styrene copolymer (ABS), acrylonitrile styrene (ANS), polyphthalamide, and polycarbonate. The polymer is most preferably acrylonitrile butadiene styrene copolymer (ABS).

The coil (410), the central processing unit (420), the inner encoder (430), the transmitter (450), and the antenna (460) can be fixed on an electrical circuit housing (480). More preferably, the coil (410), the central processing unit (420), the inner encoder (430), the transmitter (450), the antenna (460), and the DC-DC converter (470) are fixed on an electrical circuit housing (480).

The printed circuit board (400) is preferably fixed on an electrical circuit housing (480). More preferably, the printed circuit board (400) containing the coil (410), the central processing unit (420), the inner encoder (430), the transmitter (450), and the antenna (460) are fixed on an electrical circuit housing (480). Still more preferably, the printed circuit board (400) containing the coil (410), the central processing unit (420), the inner encoder (430), the transmitter (450), the antenna (460), and the DC-DC converter are fixed on an electrical circuit housing (480).

The electrical circuit housing (480) can be composed of any material. Preferably the material is not ferromagnetic, paramagnetic or diamagnetic. The material is preferably a polymer. Preferably, the polymer is resistant of aqueous acids, aqueous bases and/or alcohols. More Preferably, the polymer is resistant to aqueous acids namely hydrochloric acid and phosphoric acids. The polymer can be a thermosetting polymer (thermoset) or thermosoftening plastic (thermoplastic). Preferably, the polymer is an organic polymer. The polymer can be selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetheretheretherketone (PEEEK), polyetheretherketoneketone (PEEKK), polyetherketone-etherketoneketone (PEKEKK), polyethersulfone, polyethylene, polysuccinimide, polybismaleimide, polyimide sulfone, polymethacrylimide, polymethacrylmethylimide, polymethylpentene, polyoxymethylene, poly(p-phenylene oxide), polyphenylene sulfide, polyphthalamide, polysulfone, polyurethane, polyvinyl chloride, polyvinylidene fluoride, styrene-butadiene-styrene, epoxy resin, and phenol formaldehyde resins (phenolic resins). Preferably, the polymer is selected from the group comprising or consisting of acrylonitrile butadiene styrene copolymer (ABS), acrylonitrile styrene (ANS), cellulose acetate, cellulose acetate butyrate, cellulose acetate propionate, cellulose acetate phthalate, cellulose nitrate, cyclic olefin copolymer, poly(ethene-co-tetrafluoroethene), poly(ethene-co-chlorortrifluoroethene), fluorinated ethylene propylene, polystyrene, high impact polystyrene, polybutylene adipate terephthalate, polybutylene succinate, polybutylene terephthalate, polycarbonate, polychlorotrifluoroethylene, polyethylene terephthalate, polylactide, polyethylene naphthalate, polyetherimide, polyetherketones (PEK) such as polyetheretherketone (PEEK), polyetherketoneketone (PEKK), polyetherethere-therketone (PEEEK), polyetheretherketoneketone (PEEKK), polyetherketone-etherketoneketone (PEKEKK), polyethersulfone, polyethylene, polysuccinimide, polybis-maleimide, polyimide sulfone, polymethacrylimide, polymethacrylmethylimide, polymethylpentene, polyoxym-ethylene, poly(p-phenylene oxide), polyphenylene sulfide, polyphthalamide, polysulfone, polyurethane, polyvinyl chloride, polyvinylidene fluoride, and styrene-butadiene-styrene. More preferably, the polymer is selected from the group comprising or consisting of acrylonitrile butadiene styrene copolymer (ABS), acrylonitrile styrene (ANS), polyphthalamide, poly(ethene-co-tetrafluoroethene), poly-carbonate, polyethylene, polyimide, polystyrene, and poly-vinyl chloride. Still more preferably, the polymer is selected from the group comprising or consisting of acrylonitrile butadiene styrene copolymer (ABS), acrylonitrile styrene (ANS), polyphthalamide, and polycarbonate. The polymer is most preferably acrylonitrile butadiene styrene copolymer (ABS).

Pin

The drive shaft 120 can be linked to the other components of the rotator part (100) of the device (10) by a pin (180). The pin (180) can be composed of any material. The material is preferably not ferromagnetic. Preferably, the drive shaft (120) is composed of iron or iron alloy, more preferably iron alloy. The iron alloy can be steel, and more preferably stainless steel. It is preferred if the iron or iron alloy is not ferromagnetic. The steel is thus preferably an austenite, and more preferably stainless steel austenite. The steel can be chromium-nickel steel, preferably AISI 316 (SAE 316). Still more preferably, the steel is AISI 316. Most preferably, the pin (180) is made of an AISI 316 annealed stainless steel bar.

The drive shaft (120) can be linked by a pin (180) to the sleeve (150). Moreover, the magnet holding means (200) can be linked to the drive shaft (120) by a pin (185). Preferably, the pin interconnecting the magnet holding means (200) and the drive shaft (120) is a slotted spring pin. The slotted spring pin can be made of steel, and preferably stainless steel. The steel can have an austenitic structure. Preferably, the steel is not ferromagnetic. The steel can be a chromium-nickelsteel, preferably, the steel is 18-8 stainless steel (AISI/SAE 304).

Steel

Various nomenclature for metal and metal alloys are known, among others the Unified Numbering System for Metals and Alloys (UNS), the AISI/SAE (American Iron and Steel Institute/Society of Automotive Engineers), DIN-Stan-dard (Deutsches Institut for Normung; a standard in Ger-many) or the European Standard (EN).

The alloy AISI 1008/SAE 1008 (material number: 1.0034; UNS: G10080) has the following composition:

| 0.3-0.5 wt % | Mn |
| ≤0.05 wt % | S |
| ≤0.04 wt % | P |
| ≤0.1 wt % | C |
| Balance to 100 wt % | Fe |

Molybdenum Steel

The alloy AISI/SAE 440C (Material number 1.4125; DIN 17740, UNS: S44004, EN material designation: X105CrMo17) has the following composition:

| 16.0 wt %-18.0 wt % | Cr |
| ≤0.8 wt % | Mo |
| ≤1.0 wt % | Mn |
| ≤0.04 wt % | S |
| ≤0.04 wt % | P |
| ≤1.0 wt % | Si |
| 0.95 wt-1.20 wt % | C |
| Balance to 100 wt % | Fe |

Preferably, the alloy AISI/SAE 440c has the following composition:

| 16.0 wt %-18.0 wt % | Cr |
| 0.4-0.8 wt % | Mo |
| ≤1.0 wt % | Mn |
| ≤0.04 wt % | S |
| ≤0.04 wt % | P |
| ≤1.0 wt % | Si |
| 0.95 wt-1.20 wt % | C |
| Balance to 100 wt % | Fe |

Chromium Nickel Molybdenum Steel

The alloy AISI 316/SAE 316 (Material number: 1.4401; EN material designation: X5CrNiMo 17-12-2; UNS 31600) has the following composition:

| 16.5-18.5 wt % | Cr |
| 2.0-2.5 wt % | Mo |
| 10.0-13.0 wt % | Ni |
| ≤2.0 wt % | Mn |
| ≤0.015 wt % | S |
| ≤0.011 wt % | N |
| ≤0.045 wt % | P |
| ≤1.0 wt % | Si |
| ≤0.07 wt % | C |
| Balance to 100 wt % | Fe |

The alloy 18/8 (18-8; AISI/SAE 304; material no. 1.4301; UNS: S30400) has the following composition:

| 17.5-19.5 wt % | Cr |
| 8.0-10.5 wt % | Ni |
| ≤2.0 wt % | Mn |
| ≤0.015 wt % | S |
| ≤0.011 wt % | N |
| ≤0.045 wt % | P |
| ≤1.0 wt % | Si |
| ≤0.07 wt % | C |
| Balance to 100 wt % | Fe |

Spring Steel

DIN17224 (EN 10151:2002 or EN10270-3:2001) refers to stainless steel strip for springs (technical delivery condi-tions) or steel wire for mechanical springs (part 3: stainless spring steel wire). The spring can be composed of an alloy such as X10CrNi18-8 (material no. 1.4310), X11CrMnNiN19-8-6 (material no. 1.4369), X12CrMnNiN17-7-5 (material no. 1.4372), X20Cr13 (ma-terial no. 1.4021), X30Cr13 (material no. 1.4028), X39Cr13 (material no. 1.4031), X5CrNi18-10 (material no. 1.4301), X5CrNiMo17-12-2 (material no. 1.4401), X6Cr17 (material no. 1.4016) X7CrNiA117-7 (material no. 1.4568), X10CrNi18-8 (material no. 1.4310), X5CrNiMO17-12-2 (material no. 1.4401), or X7CrNiA117-7 (material no. 1.4568).

For example, the steel X10CrNi18-8 (material no. 1.4310) has the following composition:

| | |
|---|---|
| 16.0-19.0 wt % | Cr |
| 6.0-9.5 wt % | Ni |
| ≤2.0 wt % | Mn |
| ≤0.8 wt % | Mo |
| ≤0.015 wt % | S |
| ≤0.011 wt % | N |
| ≤0.045 wt % | P |
| ≤2.0 wt % | Si |
| 0.05-0.12 wt % | C |
| Balance to 100 wt % | Fe |

Aluminium

The alloy A6061-T6 (UNS A96061) has the following composition:

| | |
|---|---|
| 0.4-0.8 wt % | Si |
| ≤0.8 wt % | Fe |
| 0.15-0.4 wt % | Cu |
| ≤0.25 wt % | Zn |
| ≤0.15 wt % | Mn |
| 0.8-1.2 wt % | Mg |
| ≤0.15 wt % | Ti |
| 0.04-0.35 wt % | Cr |
| Balance to 100 wt % | Al |

Preferably, the alloy A6061-T6 (UNS A96061) has the following composition:

| | |
|---|---|
| 0.4-0.8 wt % | Si |
| ≤0.8 wt % | Fe |
| 0.15-0.4 wt % | Cu |
| ≤0.25 wt % | Zn |
| 0.15 wt % | Mn |
| 0.8-1.2 wt % | Mg |
| ≤0.15 wt % | Ti |
| 0.04-0.35 wt % | Cr |
| Balance to 100 wt % | Al |

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope of the invention as described in the following claims.

DESCRIPTION OF THE FIGURES

FIG. 16 shows a schematic view of an exemplary coil (410) in square wave pattern printed on the circuit board (400). B refers to the center line of the coil. A represents closest distance between the center line and the square wave pattern and P represents the length of each segment of the square wave pattern.

Figure 1:
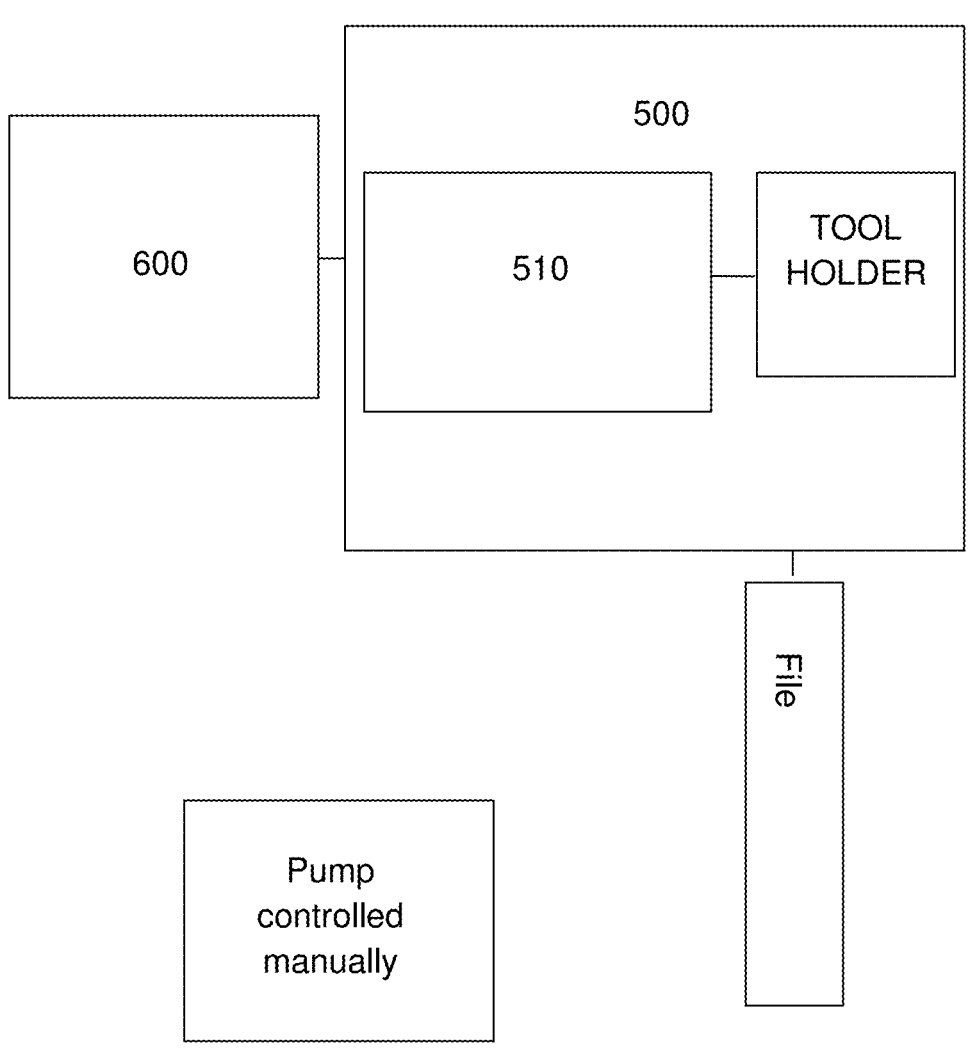
FIG. 1 shows a schematic representation of the state of the art.
Figure 2:
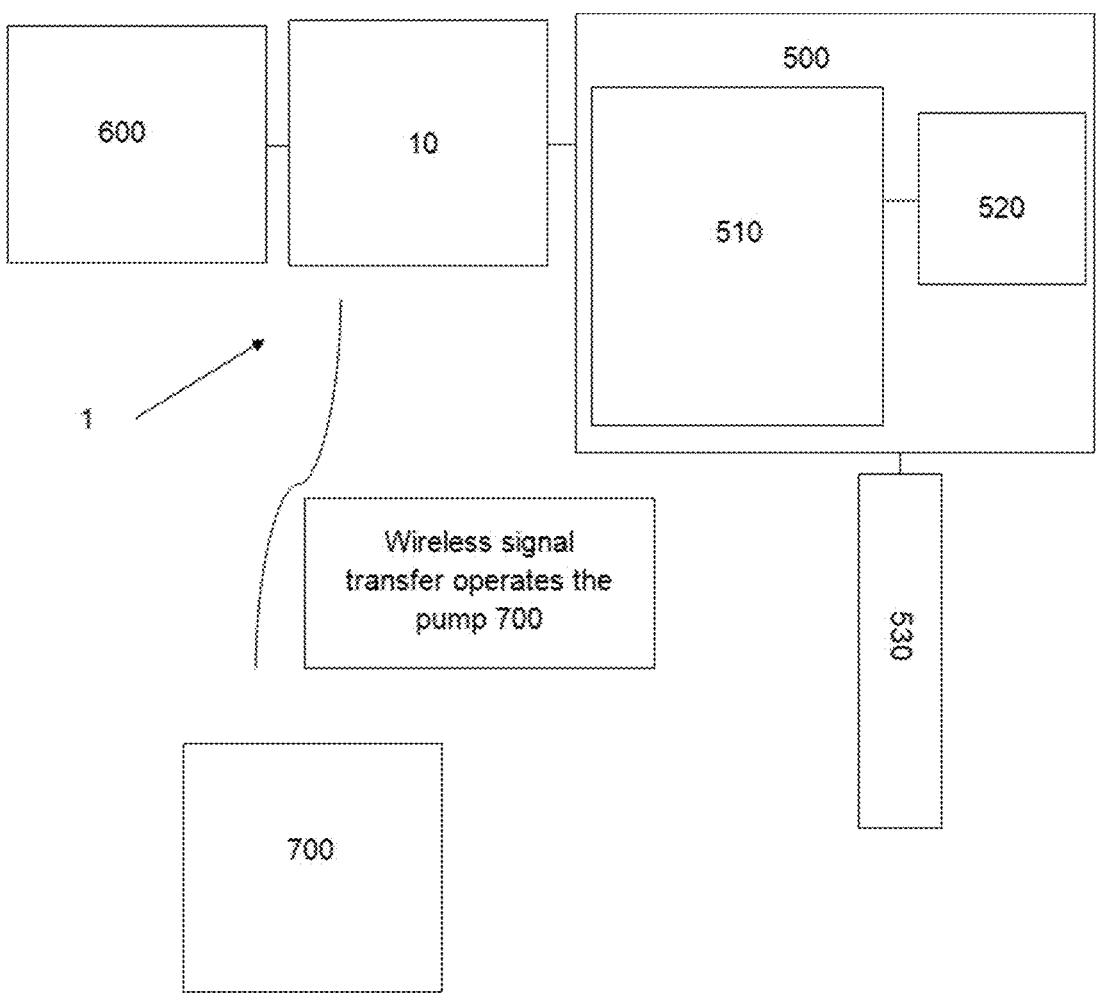
FIG. 2 shows a schematic representation of an embodiment of a device (10) according to the invention for driving an endodontic file head (500) of an endodontic device (1) and operating a remote pump (700). The head can consist of file (530), a tool holder (520) and a drive arrangement or part of a drive arrangement (510).
Figure 3:
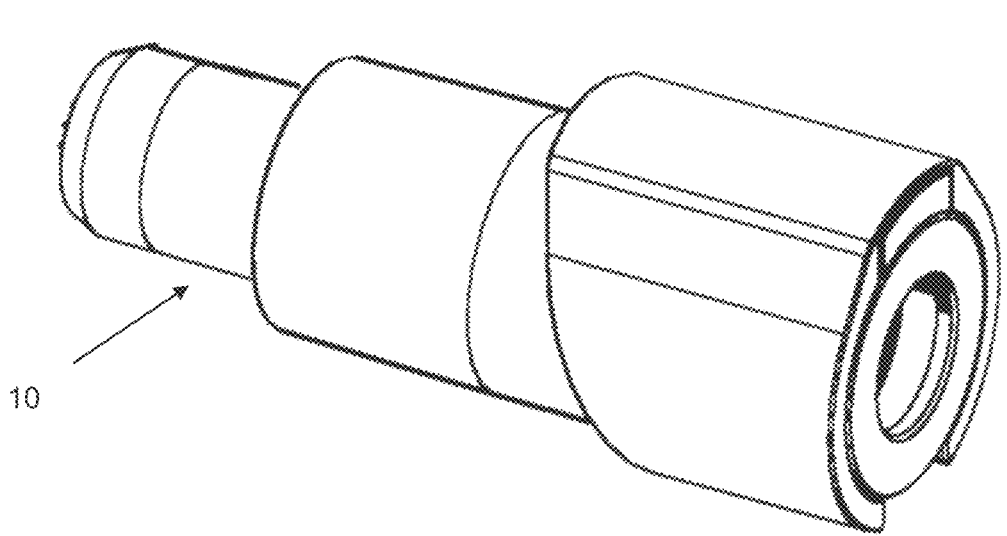
FIG. 3 shows the device (10) according to the invention. The perspective shows the sleeve (150) for the connection to the motorized power handle (600).
Figure 4:
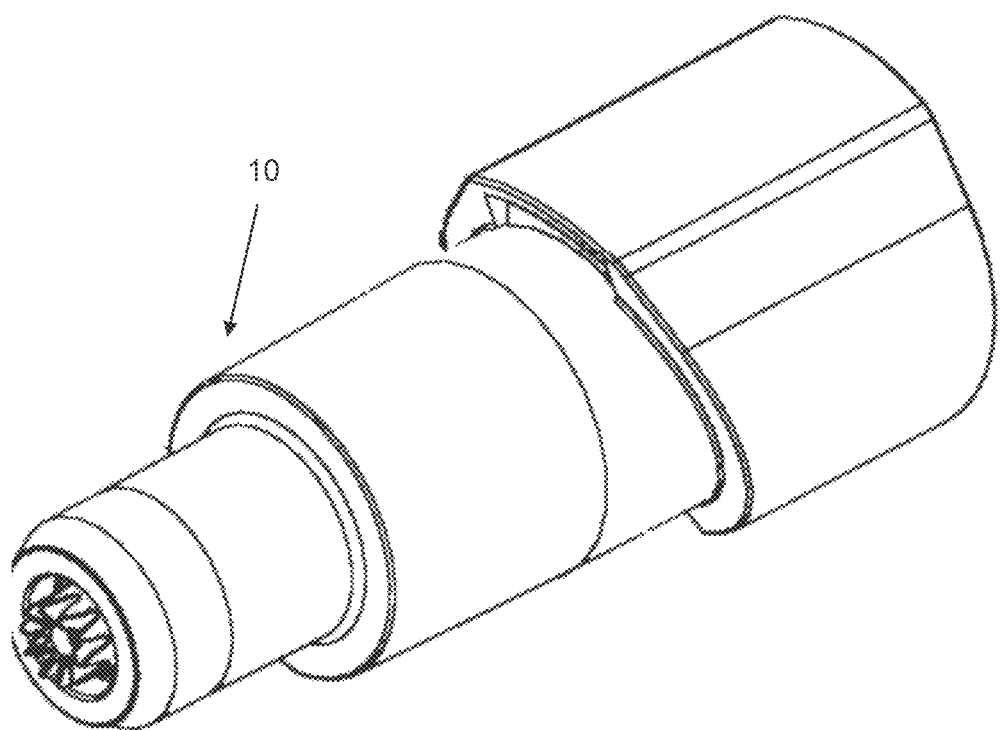
FIG. 4 shows the device (10) according to the invention. The perspective shows the gear in form of a bevel gear.
Figure 5:
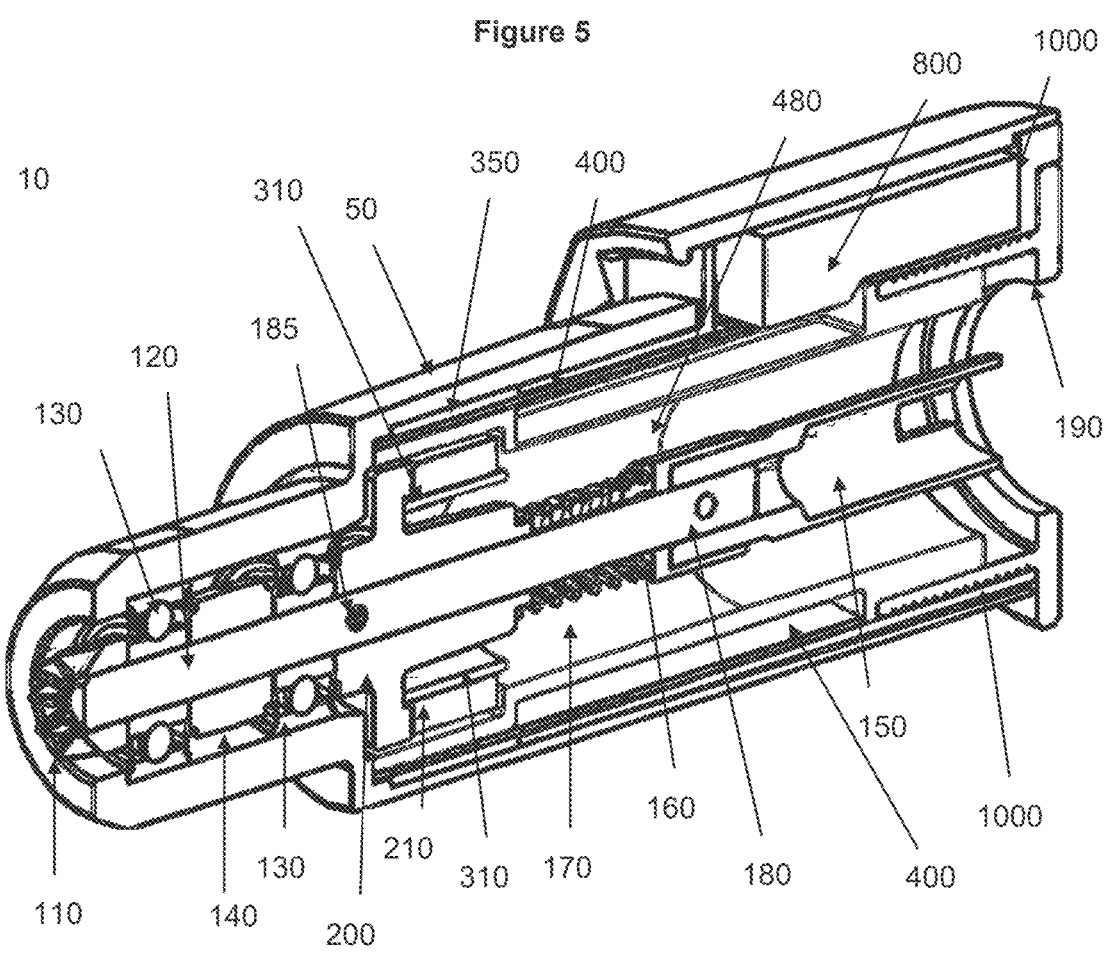
FIG. 5 shows the longitudinal section of the device (10) according to the invention.
Figure 6:
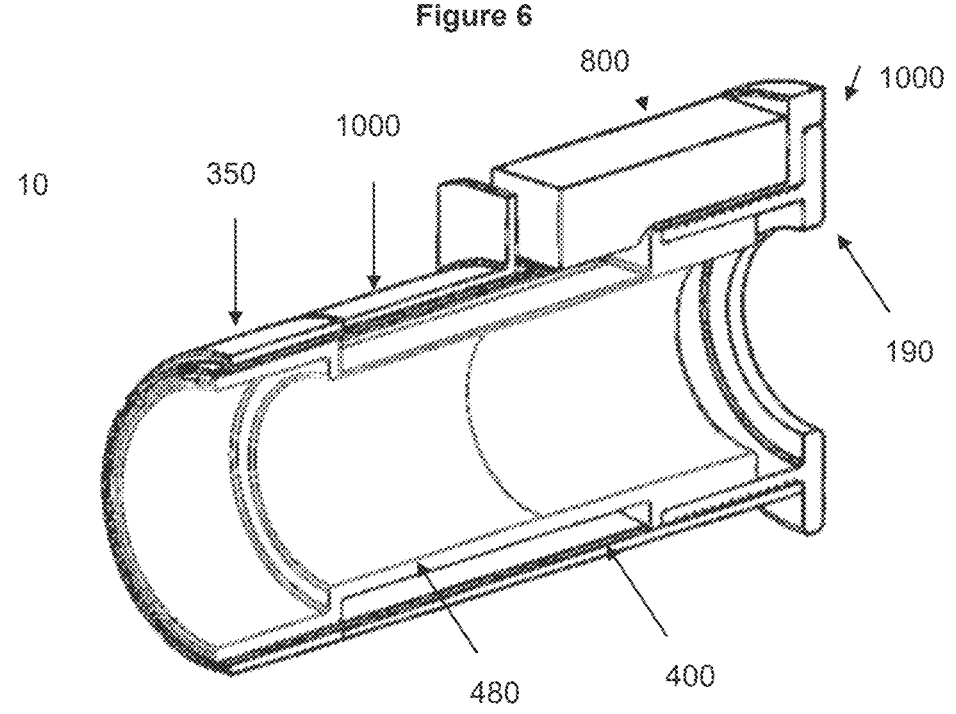
FIG. 6 shows the longitudinal section of the device (10) according to the invention without the rotator part (100).
Figure 7:
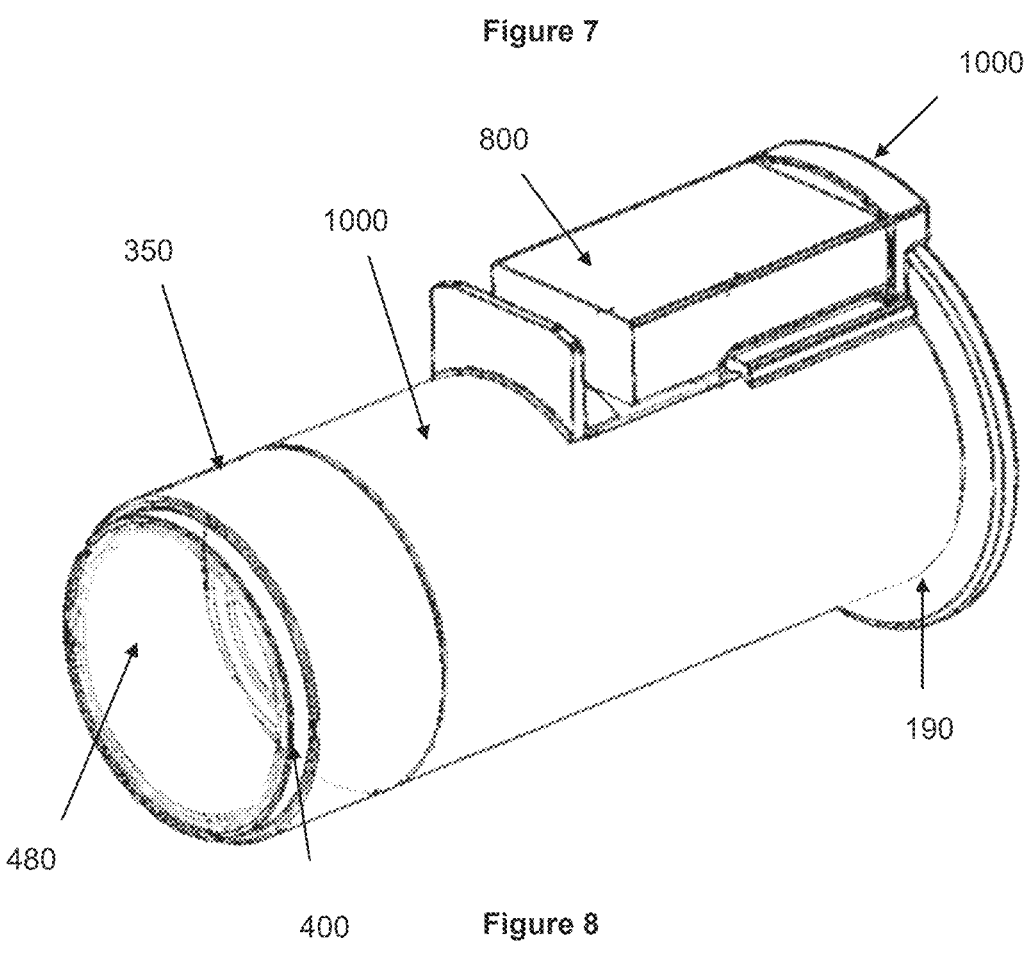
FIG. 7 shows a view of the device (10) according to the invention without the rotator part (100).
Figure 8:
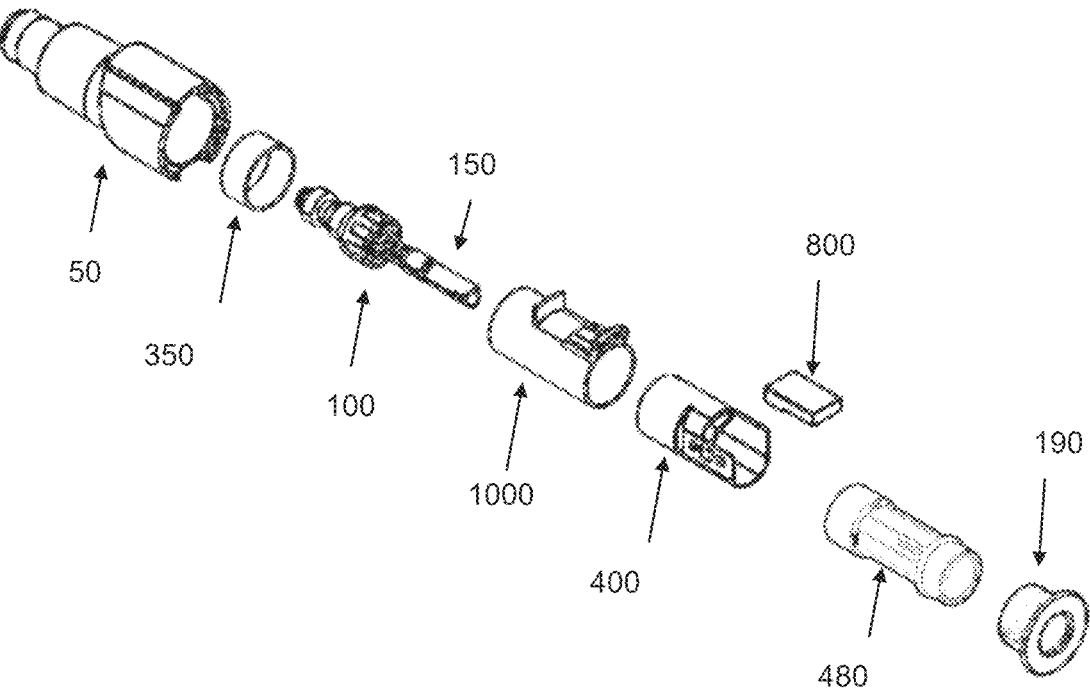
FIG. 8 shows an explosion view of the device (10) according to the invention
Figures 9, 10:
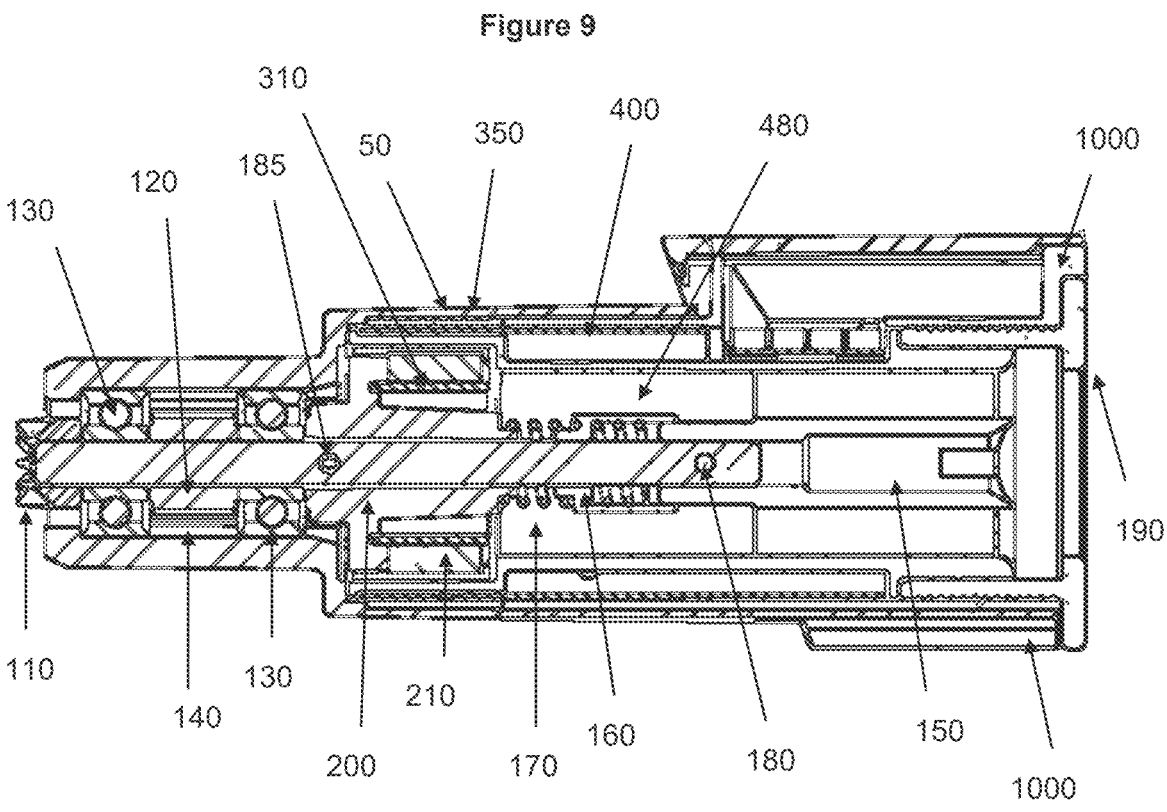
FIG. 9 shows the longitudinal section of an embodiment of the device (10) according to the invention without a battery (800).
FIG. 10 shows a view of an embodiment of the device (10) according to the invention without a battery (800), the rotator part (100) is omitted.
Figure 11:
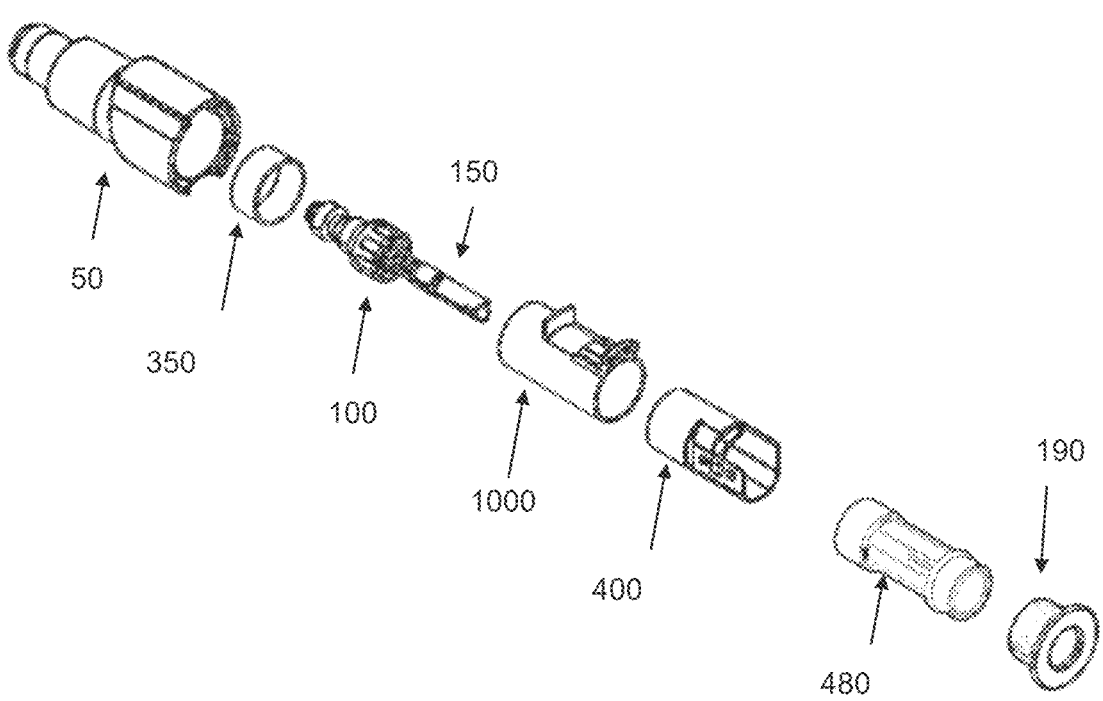
FIG. 11 shows an explosion view of an embodiment of the device (10) according to the invention without a battery.
Figure 12:
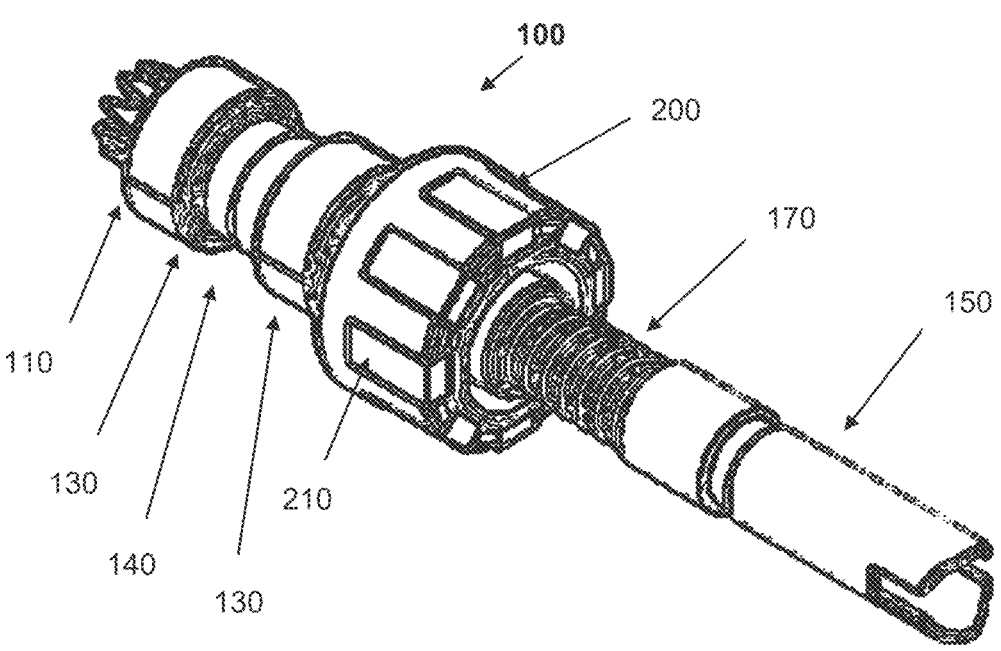
FIG. 12 shows the rotator part (100).
Figure 13:
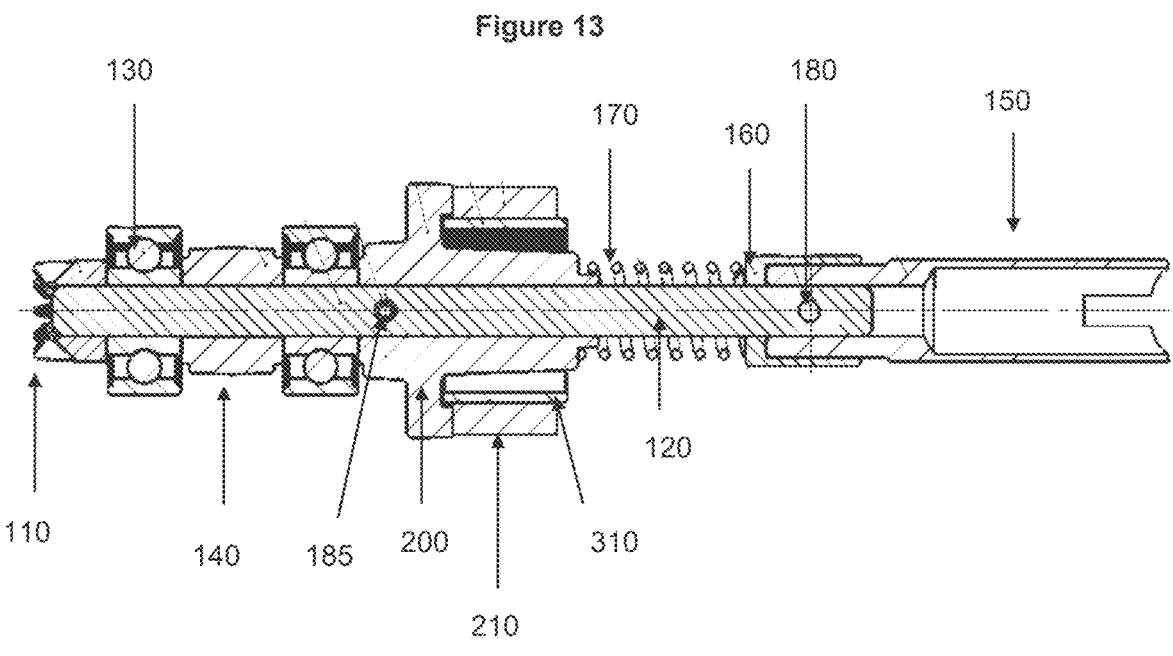
FIG. 13 shows a longitudinal section of rotator part (100).
Figure 14:
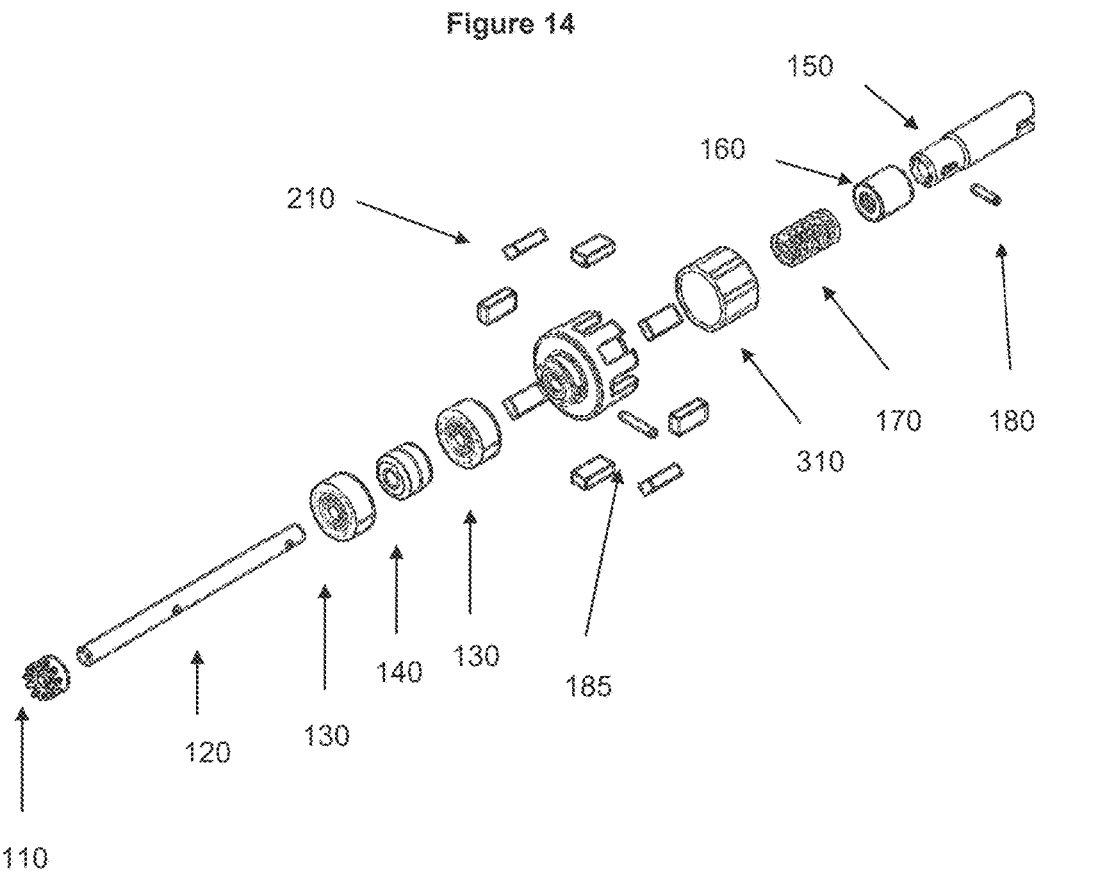
FIG. 14 shows an explosion view of the rotator part (100).
Figure 15:
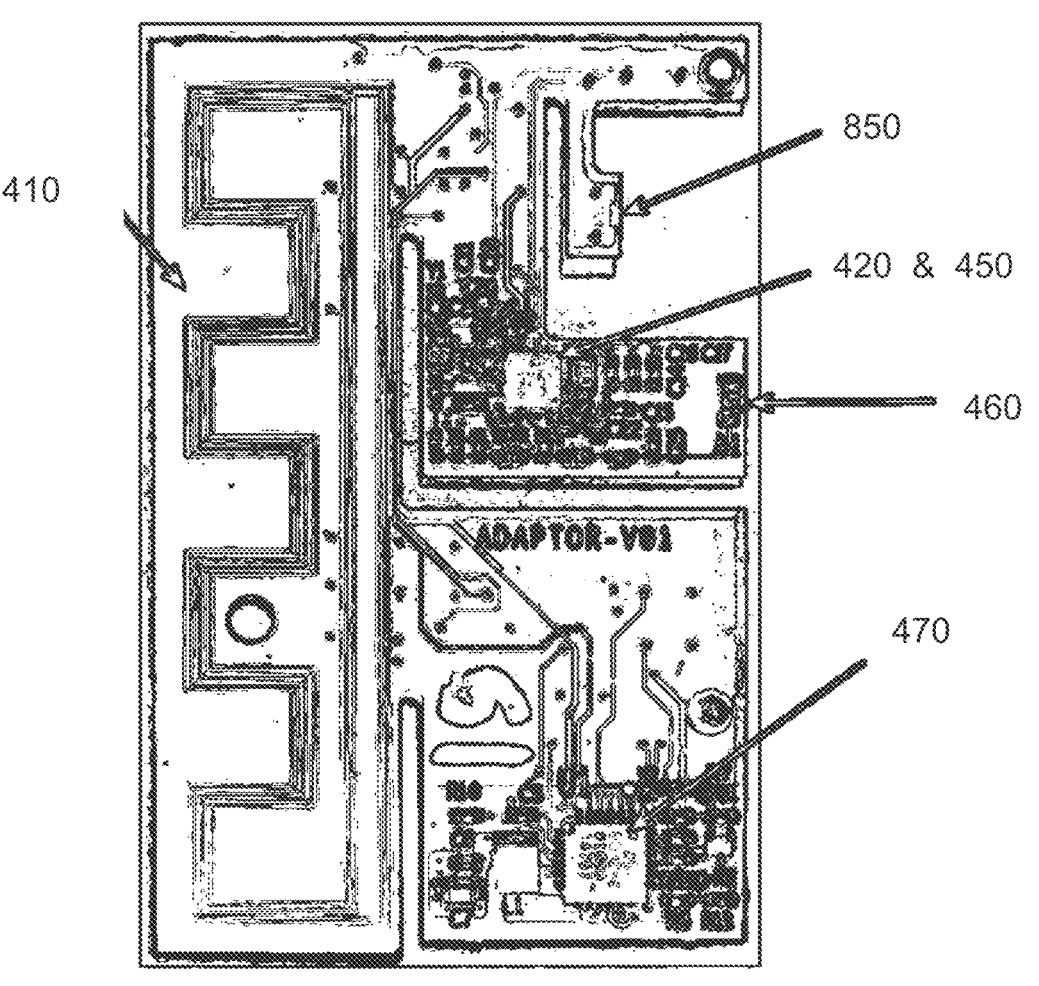
FIG. 15 shows an embodiment of the printed circuit board (400).

| Reference Signs | |
|---|---|
| 1 | endodontic device |
| 10 | device for driving an endodontic file head of an endodontic device and operating a remote pump |
| 50 | housing |
| 100 | rotator part |
| 110 | gear |
| 115 | steel bevel gear |
| 120 | drive shaft |
| 130 | bearing |
| 140 | bearing spacer |
| 150 | sleeve |
| 160 | securing cup |
| 170 | spring |
| 180, 185 | pin |
| 190 | adapter |
| 200 | magnet holding means |
| 205 | magnetic separator |
| 210 | magnet |
| 310 | first cylindrical holding means |
| 350 | second cylindrical holding means |
| 400 | printed circuit board |
| 410 | coil |
| 420 | central processing unit |
| 430 | inner encoder |
| 450 | transmitter |

71

-continued

| Reference Signs | |
| --- | --- |
| 460 | antenna |
| 470 | DC-DC converter |
| 480 | electrical circuit housing |
| 500 | endodontic file head |
| 510 | drive arrangement |
| 520 | tool holder |
| 530 | file |
| 600 | motorized power handle |
| 700 | remote pump |
| 800 | battery |
| 810 | rechargeable battery |
| 850 | battery connection |
| 860 | capacitor |
| 870 | capacitor charger |
| 880 | capacitor connection |
| 900 | battery charger |
| 1000 | outer ring |

What is claimed is:

1. A device for driving an endodontic file head of an endodontic device and for operating a remote pump, the device comprising:

a gear for the connection with the endodontic file head;

a drive shaft for rotating the gear and for rotating at least one magnet;

a first cylindrical element surrounding the drive shaft;

a rotatable magnet holding means surrounding the first cylindrical element;

at least one magnet fixed in the rotatable magnet holding means;

a coil surrounding the rotatable magnet holding means;

a second cylindrical element surrounding the coil;

a central processing unit electrically connected to the coil for receiving signals induced by rotation of the at least one magnet and for controlling operation of the device;

an inner encoder implemented on the central processing unit for measuring a velocity of the drive shaft based on the signals induced in the coil;

a transmitter operatively connected to the central processing unit for generating a signal;

an antenna operatively connected to the transmitter for sending the signal to a remote pump; and at least one sleeve interlinked with the drive shaft for moving the drive shaft by a motorized power handle.

2. The device according to claim 1, wherein the gear is a steel bevel gear.

3. The device according to claim 1, wherein the first cylindrical element and the second cylindrical element comprises a metal.

4. The device according to claim 3, wherein the metal is an iron alloy.

5. The device according to claim 4, wherein the iron alloy contains carbon in an amount up to 0.2 wt %.

6. The device according to claim 1, wherein the magnet holding means is a magnetic separator.

7. The device according to claim 1, wherein the at least one magnet is eight magnets.

8. The device according to claim 1, wherein the at least one magnet is made of an alloy.

9. The device according to claim 1, wherein the at least one magnet is made of a nickel-plated neodymium-iron-boron alloy.

10. The device according to claim 1, wherein the at least one magnet is formed by two or more magnets arranged symmetrically around the drive shaft, and neighbouring magnets have opposite polarity.

11. The device according to claim 1, wherein the inner encoder on the central processing unit for measuring the velocity of the drive shaft is implemented by means of the central processing unit counting the time that passes between threshold crossing of a sine wave signal being generated in the coil, the sine wave signal is proportional to the velocity of the drive shaft.

12. The device according to claim 1, wherein the coil, the central processing unit, the inner encoder, the transmitter, and the antenna are on a printed circuit board.

13. The device according to claim 1, wherein the device contains a DC-DC converter electrically connected to the central processing unit and configured to regulate power supplied to the coil and the transmitter.

14. The device according to claim 13, wherein the DC-DC converter contains a maximum power point tracking algorithm.

15. The device according to claim 13, wherein the device further comprises at least one rechargeable battery electrically connected to the DC-DC converter to provide power to the central processing unit, coil, transmitter, and antenna.

* * * * *